United States Patent
Uozumi et al.

(10) Patent No.: US 10,744,599 B2
(45) Date of Patent: Aug. 18, 2020

(54) METAL ADDITIVE MANUFACTURING WELDING CONDITION CONTROL DEVICE AND METHOD

(71) Applicant: Mitsubishi Electric Corporation, Tokyo (JP)

(72) Inventors: Seiji Uozumi, Tokyo (JP); Shun Kayashima, Tokyo (JP); Nobuyuki Sumi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/330,371

(22) PCT Filed: Jul. 30, 2018

(86) PCT No.: PCT/JP2018/028471
§ 371 (c)(1),
(2) Date: Mar. 5, 2019

(87) PCT Pub. No.: WO2020/026306
PCT Pub. Date: Feb. 6, 2020

(65) Prior Publication Data
US 2020/0030915 A1  Jan. 30, 2020

(51) Int. Cl.
*B23K 26/342* (2014.01)
*B23K 26/03* (2006.01)
(Continued)

(52) U.S. Cl.
CPC .......... *B23K 26/342* (2015.10); *B23K 26/034* (2013.01); *B23K 26/0626* (2013.01);
(Continued)

(58) Field of Classification Search
None
See application file for complete search history.

(56) References Cited

U.S. PATENT DOCUMENTS

2006/0081571 A1   4/2006   Hoebel et al.
2007/0205184 A1*  9/2007   Mazumder ............... B23H 9/00
                                                         219/69.17
(Continued)

FOREIGN PATENT DOCUMENTS

JP      11-347761 A      12/1999
JP      2005-537934 A    12/2005
(Continued)

OTHER PUBLICATIONS

International Search Report dated Sep. 11, 2018 for PCT/JP2018/028471 filed on Jul. 30, 2018, 8 pages including translation of the Written Opinion only.

(Continued)

*Primary Examiner* — Bernard G Lindsay
(74) *Attorney, Agent, or Firm* — Xsensus LLP

(57) ABSTRACT

A deposition condition control device includes: a machining program analyzing unit that obtains a scan rate of a laser beam; a data acquiring unit that acquires an output value of the laser beam, a supply amount of the metal material, and a temperature of the portion to be machined in a molten state; a welding state determination unit that determines whether or not a welding state of the metal material is a stable welding amount state on the basis of the scan rate, the output value, the supply amount, and the temperature; a deposition condition adjusting unit that adjusts the output value and the supply amount so that a result of the determination will be the stable welding amount state; and a deposition condition outputting unit that outputs a command value of the adjusted output value and a command value of the adjusted supply amount to the machine tool.

14 Claims, 17 Drawing Sheets

(51) Int. Cl.
*B23K 26/06* (2014.01)
*G05B 19/4063* (2006.01)
*B23K 26/14* (2014.01)
*B23K 26/70* (2014.01)
*B23K 26/082* (2014.01)

(52) U.S. Cl.
CPC ........ *B23K 26/082* (2015.10); *B23K 26/1464* (2013.01); *B23K 26/702* (2015.10); *G05B 19/4063* (2013.01)

(56) References Cited

U.S. PATENT DOCUMENTS

| | | | | |
|---|---|---|---|---|
| 2014/0034615 | A1* | 2/2014 | Sumner | B23K 9/04 |
| | | | | 219/76.14 |
| 2016/0318128 | A1* | 11/2016 | Dutton | B22F 3/1055 |
| 2017/0297107 | A1* | 10/2017 | Oka | B22F 3/1055 |
| 2018/0229302 | A1* | 8/2018 | Furrer | B22F 3/1055 |
| 2018/0333805 | A1* | 11/2018 | Matsumoto | B23K 26/0884 |
| 2018/0370114 | A1* | 12/2018 | Hopkins | C08L 83/00 |
| 2019/0039318 | A1* | 2/2019 | Madigan | B23K 26/032 |

FOREIGN PATENT DOCUMENTS

| | | |
|---|---|---|
| JP | 2017-190505 A | 10/2017 |
| JP | 2018-034514 A | 3/2018 |

OTHER PUBLICATIONS

Abioye et al, "A Parametric Study Of Inconel 625 Wire Laser Deposition", Journal of Materials Processing Technology, 2013, pp. 2145-2151.

\* cited by examiner

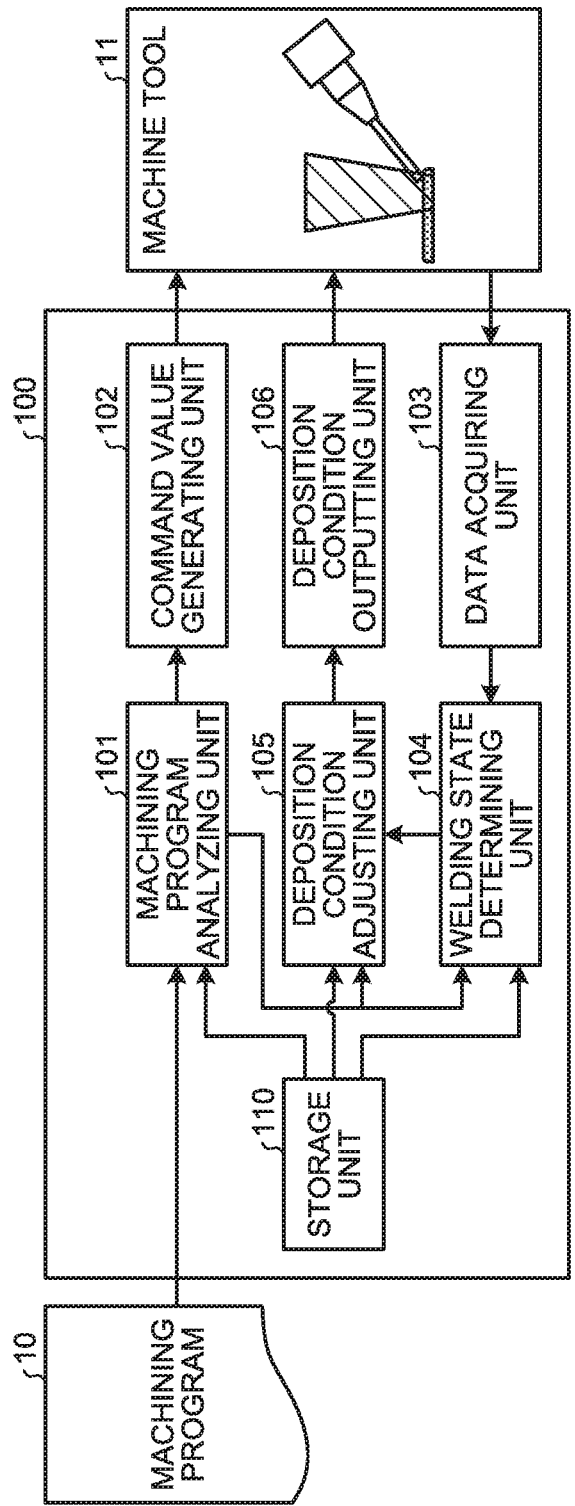

FIG.2

```
N100 G90       : ABSOLUTE VALUE COMMAND
N101 G0XxYyZz1 : MOVE TO XxYyZz1 BY FAST-FORWARD
N102 G43H1     : CORRECT LASER DIAMETER/FOCUS BY H1-TH CORRECTION AMOUNT
N103 G1        : SPECIFY MODE FOR DEPOSITION
N104 Mxx       : SELECT DEPOSITION CONDITION DATA D1
N105 XxYy      : HEREINAFTER, COORDINATE VALUES FOR EXPRESSING LAYER SHAPE
   ⋮           } COORDINATE VALUE GROUP FOR FIRST LAYER

N200 G0XxYyZz2 : MOVE TO XxYyZz2 BY FAST-FORWARD
N201 G1        : SPECIFY MODE FOR DEPOSITION
N202 XxYy      : HEREINAFTER, COORDINATE VALUES FOR EXPRESSING LAYER SHAPE
   ⋮           } COORDINATE VALUE GROUP FOR SECOND LAYER

N300 G0XxYyZz3 : MOVE TO XxYyZz3 BY FAST-FORWARD
N301 G1        : SPECIFY MODE FOR DEPOSITION
N302 XxYyZz    : HEREINAFTER, COORDINATE VALUES FOR EXPRESSING LAYER SHAPE
   ⋮           } COORDINATE VALUE GROUP FOR THIRD LAYER
```

|  | DEPOSITION CONDITION DATA D1 | DEPOSITION CONDITION DATA D2 | DEPOSITION CONDITION DATA D3 | DEPOSITION CONDITION DATA D4 | DEPOSITION CONDITION DATA D5 | DEPOSITION CONDITION DATA D6 |
|---|---|---|---|---|---|---|
| DEPOSITION HEIGHT AND DEPOSITION WIDTH | (h, d) | (h, d) | (h, d) | (h, d) | (2h, d) | (h/2, d) |
| LASER SCAN RATE | F1 | F2 | F3 | F4 | F5 | F6 |
| LASER OUTPUT VALUE | P1 | P2 | P3 | P4 | P5 | P6 |
| METAL MATERIAL SUPPLY AMOUNT | V1 | V2 | V3 | V4 | V5 | V6 |

FIG.16

| | DEPOSITION CONDITION DATA D1 | DEPOSITION CONDITION DATA D2 | DEPOSITION CONDITION DATA D3 | DEPOSITION CONDITION DATA D4 | DEPOSITION CONDITION DATA D5 | DEPOSITION CONDITION DATA D6 |
|---|---|---|---|---|---|---|
| DEPOSITION HEIGHT AND DEPOSITION WIDTH | (h, d) | (h, d) | (h/2, d) | (h/3, d) | (h, d/5) | (h, d/3) |
| LASER SCAN RATE | F1 | F2 | F3 | F4 | F5 | F6 |
| LASER OUTPUT VALUE | P1 | P2 | P3 | P4 | P5 | P6 |
| METAL MATERIAL SUPPLY AMOUNT | V1 | V2 | V3 | V4 | V5 | V6 |

METAL ADDITIVE MANUFACTURING WELDING CONDITION CONTROL DEVICE AND METHOD

CROSS-REFERENCE TO RELATED APPLICATIONS

The present application is based on PCT filing PCT/JP2018/028471, filed Jul. 30, 2018, the entire contents of which are incorporated herein by reference.

FIELD

The present invention relates to a deposition condition control device for performing additive manufacturing with metal materials by using a machine tool.

BACKGROUND

Metal additive manufacturing in a direct energy deposition (DED) method is a process of welding metal on an area to be machined by supplying a metal material such as metal powder or metal wire while locally melting the metal material by emitting a laser beam onto the metal material. Since this technique is characterized in high flexibility of shaping, which enables a shape that is difficult to produce by cutting methods to be easily formed.

In the metal additive manufacturing, a numerical control (NC) device that adjusts process parameters such as a laser output, a supply amount of metal powder or metal wire, and also the temperature of a molten pool is called a deposition condition control device. In addition, a pool of molten metal resulting from melting of a base material is called a molten pool. When metal additive manufacturing is performed by using a deposition condition control device, machining programs are typically created by a computer aided manufacturing (CAM). A machining program describes information on a machined shape, a laser output, and a supply amount of metal powder or metal wire. The deposition condition control device reads the machining program, and computes a movement path of a portion to be machined, which is part of the base material, to be irradiated with the laser beam. Furthermore, the deposition condition control device performs processes including acceleration/deceleration, and computes interpolation points, which are command points per unit time on the movement path. Respective drive shafts of the numerically-controlled machine tool are controlled with the computed interpolation point data, and the portion to be machined or the laser irradiation position is moved to a target position, so that the portion to be machined is irradiated with laser beam of the laser beam output value described in the machining program. The portion to be machined, which is part of the base material, is molten to form a molten pool, to which the metal powder or metal wire is supplied at a rate described in the machining program. After a lapse of certain time, the portion to be machined is resolidified with deposited metal, and additive manufacturing is thus carried out. In this process, for obtaining a target shape or a fine structure, the portion to be machined or the laser irradiation position needs to be moved to a target position, and process parameters such as the laser irradiation amount to the portion to be machined, the supply amount of metal powder or metal wire, and also the temperature of the molten pool need to be adjusted. In Patent Literature 1, for example, the laser output and the supply amount of metal powder or metal wire are thus adjusted in view of the temperature of the molten pool.

CITATION LIST

Patent Literature

Patent Literature 1: Japanese Translation of PCT International Application Laid-open No. 2005-537934

SUMMARY

Technical Problem

Even when the laser output and the supply amount of metal powder or metal wire are adjusted in view of the temperature of the molten pool, however, the welding state of the metal powder or the metal wire at the temperature of the molten pool is not considered in the adjustment, which causes a problem that a target layer shape may not be obtained.

The present invention has been made in view of the above, and an object thereof is to provide a deposition condition control device capable of obtaining a target layer shape with high accuracy.

Solution to Problem

To solve the aforementioned problems and achieve the object, the present invention provides a deposition condition control device for controlling a deposition condition of a machine tool that moves a laser irradiation position while supplying a metal material onto a portion to be machined of a base material to perform additive manufacturing includes: a machining program analyzing unit that obtains a scan rate of a laser beam at the laser irradiation position on the basis of a machining program; a data acquiring unit that acquires an output value of the laser beam, a supply amount of the metal material, and a temperature of the portion to be machined in a molten state; and a welding state determination unit that determines whether or not a welding state of the metal material is a stable welding amount state on the basis of the scan rate, the output value, the supply amount, and the temperature. The present invention includes a deposition condition adjusting unit that adjusts the output value and the supply amount so that a result of determination by the welding state determination unit will be the stable welding amount state; and a deposition condition outputting unit that outputs a command value of the output value and a command value of the supply amount adjusted by the deposition condition adjusting unit to the machine tool (11).

Advantageous Effects of Invention

The present invention produces an effect of providing a deposition condition control device capable of obtaining a target layer shape with high accuracy.

BRIEF DESCRIPTION OF DRAWINGS

FIG. 1 is a diagram illustrating a configuration of a deposition condition control device according to a first embodiment of the present invention.

FIG. 2 is a diagram illustrating an example of a machining program according to the first embodiment.

FIG. 16 is a table illustrating six sets of deposition condition data stored in a storage unit according to the second embodiment.

DESCRIPTION OF EMBODIMENTS

Figures 3, 4:
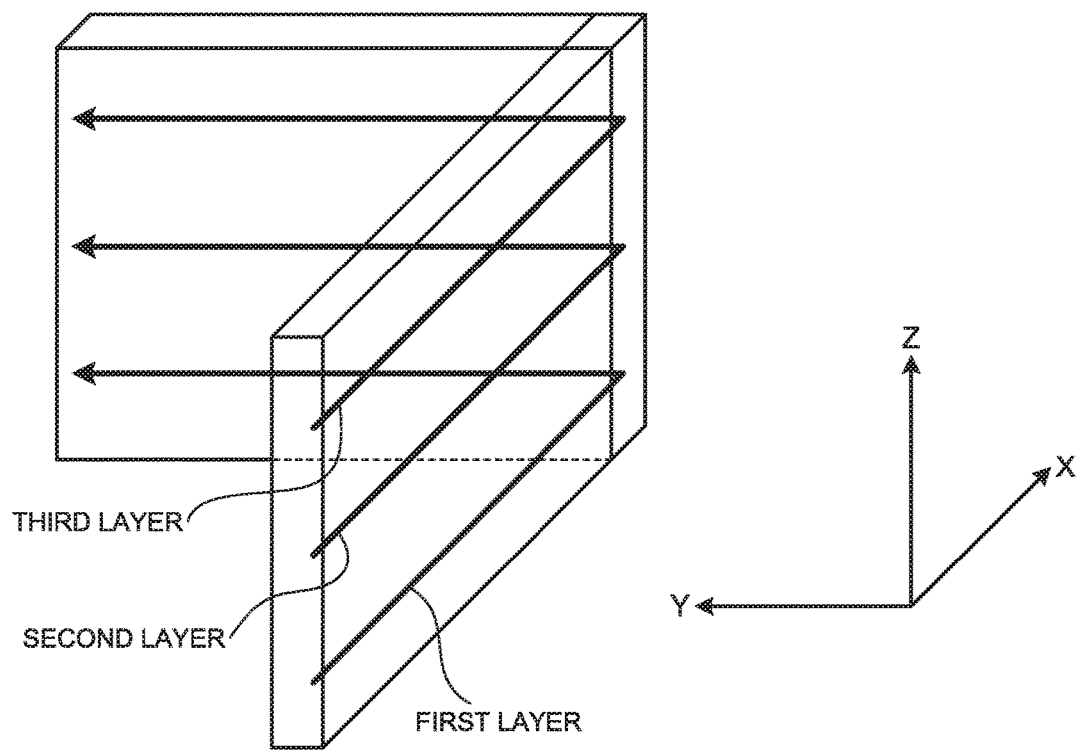
FIG. 3 is a diagram illustrating an additively manufactured object formed by using a machining program according to the first embodiment.
FIG. 4 is a table illustrating six sets of deposition condition data stored in a storage unit according to the first embodiment.

A deposition condition control device according to certain embodiments of the present invention will be described in detail below with reference to the drawings. Note that the present invention is not limited to the embodiments.

First Embodiment

FIG. 1 is a diagram illustrating a configuration of a deposition condition control device 100 according to a first embodiment of the present invention. The deposition condition control device 100 illustrated in FIG. 1 is a numerical control device that controls a machine tool 11, which is an NC machine tool for additive manufacturing, by outputting a movement command, which is a group of interpolation points per unit time, a laser output command, and a supply amount command of a metal material such as metal powder or metal wire according to a machining program 10 input from outside. The supply amount of a metal material such as metal powder or metal wire will be referred to as a metal material supply amount.

The deposition condition control device 100 includes a machining program analyzing unit 101 that obtains a shape of an additively manufactured object, which is a machining target, and obtains a scan rate of a laser beam at a laser irradiation position by pre-reading a machining program 10, a command value generating unit 102 that generates interpolation points per unit time on the basis of the scan rate and outputs the interpolation points to the machine tool 11, a data acquiring unit 103 that acquires a laser output value, which is an output value of the laser beam, the metal material supply amount, and temperature data of an object to be layered, a welding state determination unit 104 that determines the state of the welding amount of a metal material on the basis of the scan rate, the laser output value, the metal material supply amount, and the temperature data of the object to be layered, a deposition condition adjusting unit 105 that adjusts the laser output value and the metal material supply amount so that the result of state determination performed by the welding state determination unit 104 is a proper state, a deposition condition outputting unit 106 that outputs the laser output value and the metal material supply amount from the deposition condition adjusting unit 105 to the machine tool 11, and a storage unit 110 that stores deposition condition data. The scan rate of the laser beam at the laser irradiation position is referred to as a laser scan rate. In addition, pre-reading of a machining program 10 refers to reading part of the machining program 10 that describes the content of machining at a timing earlier than the actual machining timing.

Hereinafter, the respective components of the deposition condition control device 100 in more detail.

FIG. 2 is a diagram illustrating an example of the machining program 10 according to the first embodiment. The machining program 10 is input to the machining program analyzing unit 101 from outside of the deposition condition control device 100.

FIG. 3 is a diagram illustrating an additively manufactured object formed by using the machining program 10 according to the first embodiment. With the machine tool 11, a supplied metal material such as metal powder or metal wire is deposited on a portion to be machined on a surface of a base material that is melted by being heated by the laser beam. The deposition is performed in such a manner that a laser irradiation area moves on the base material in a corner shape, which is stacked in three layers in a Z direction, and the additively manufactured object illustrated in FIG. 3 is thus obtained.

Note that a target deposition height and a target deposition width of the additively manufactured object illustrated in FIG. 3 are represented by h and d, respectively. Note that the deposition width refers to the width of the additively manufactured object in a direction perpendicular to the direction of the deposition height and the scanning direction of the laser beam. The deposition height h, the deposition width d, the laser output value P1, which is a deposition condition for achieving deposition with the deposition height h and the deposition width d, the metal material supply amount V1, and the laser scan rate F1 under these conditions constitute deposition condition data D1. An N104 block of the machining program 10 illustrated in FIG. 2 specifies selecting the deposition condition data D1. Note that the specification of the deposition condition data D1 may be performed by the user or another device from outside of the deposition condition control device 100.

For additive manufacturing, a target deposition height and a target deposition width, and a laser output command value and a metal material supply amount command value for these conditions are required. The storage unit 110 of the deposition condition control device 100 stores at least one set of data, each set including information on the deposition height and the deposition width, and the laser output value, the metal material supply amount, and the laser scan rate for these conditions. The set of data is referred to as deposition condition data, and command values of the laser output value and the metal material supply amount are specified in the machining program 10 by using G codes or M codes on the basis of the stored deposition condition data for achieving the target deposition height and the target deposition width. Note that the laser output command value and the metal material supply amount command value may be directly described in the machining program 10 so that the target deposition height and the target deposition width will be achieved. Alternatively, a plurality of sets of a target deposition height and a target deposition width may be stored as setting parameters in the storage unit 110 or the like, and a deposition height and a deposition width may be specified by a user or another device from outside of the deposition condition control device 100. Thus, the target deposition height and the target deposition width are specified by the machining program or from outside.

As described above, the storage unit 110 of the deposition condition control device 100 stores at least one set of deposition condition data. FIG. 4 is a table illustrating six sets of deposition condition data D1 to D6 stored in the storage unit 110 according to the first embodiment. FIG. 4 illustrates an example of the deposition height and the deposition width, and the laser scan rate, the laser output value, and the metal material supply amount associated therewith in each of the six sets of deposition condition data D1 to D6.

Hereinafter, the operations of the respective components of the deposition condition control device 100 will be explained in detail.

(Machining Program Analyzing Unit 101)

When the machining program 10 of FIG. 2 is input from outside, the machining program analyzing unit 101 obtains the shape of an additively manufactured object, which is a machining target, by pre-reading the machining program 10, performs analysis, and determines a laser scan rate. First, the machining program analyzing unit 101 pre-reads a block relating to the corner shape of the first layer of the additively manufactured object from the machining program 10, and determines a command rate Fc(i,k), which is a laser scan rate per unit time. Note that the block relating to the corner shape can be distinguished on the basis of the descriptions in the block and previous and next blocks. Note that i represents time, and k represents a layer (k=1, 2, 3 (-th layer)). Thus, Fc(i,1) represents the command rate of the first layer at time i.

Specific processes performed by the machining program analyzing unit 101 include an acceleration/deceleration process of generating a velocity waveform for acceleration/deceleration at a preset acceleration, and a smoothing process of smoothing the velocity waveform generated by the acceleration/deceleration process. Note that the smoothing process is also called a moving average filtering process.

Figure 5:
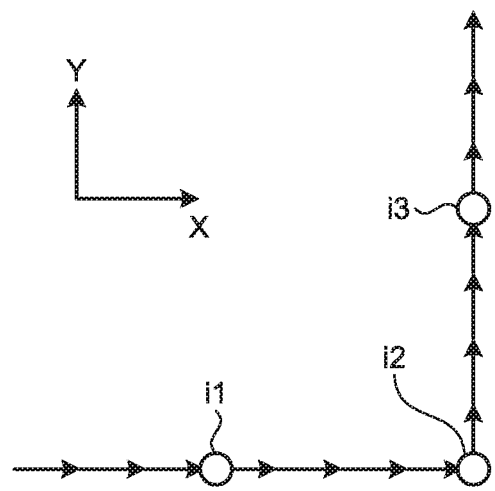
FIG. 5 is a diagram illustrating a laser irradiation path at a corner-shaped portion of a first layer of an additively manufactured object in the first embodiment.
Figure 6:
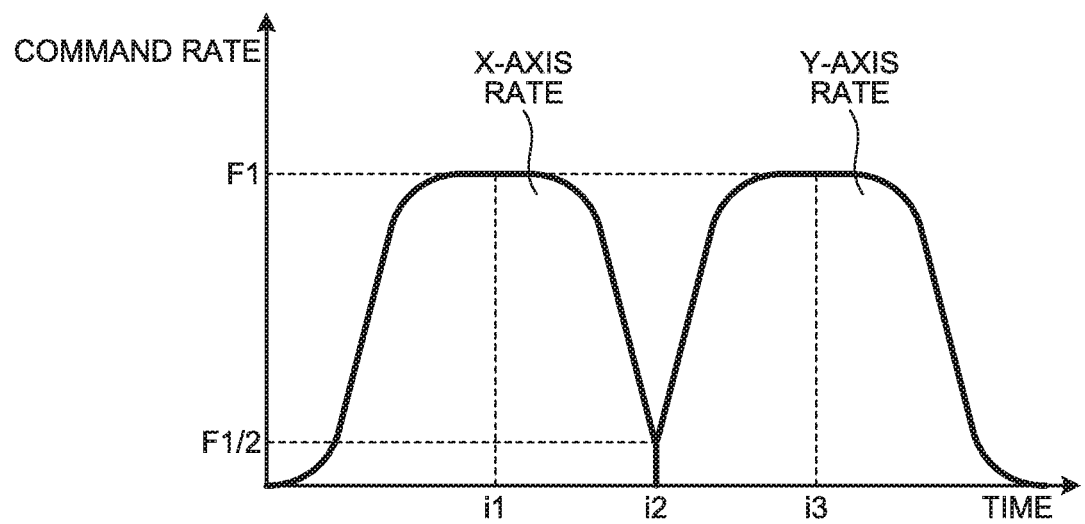
FIG. 6 is a graph illustrating an example of a velocity waveform associated with FIG. 5.

FIG. 5 is a diagram illustrating a laser irradiation path at a corner-shaped portion of the first layer of the additively manufactured object in the first embodiment. FIG. 6 is a graph illustrating an example of the velocity waveform associated with FIG. 5. Specifically, FIG. 6 is a graph illustrating an example of the velocity waveform obtained by the machining program analyzing unit 101 at the corner shape of the first layer of the additively manufactured object.

FIG. 5 illustrates laser irradiation positions at time i1, time i2, and time i3 on the laser irradiation path. As illustrated in FIG. 6 the laser scan rate gradually accelerates by the acceleration/deceleration process immediately after the laser irradiation position starts moving, and a command rate Fc(i1,1) at time i1 reaches F1. Thereafter, the laser scan rate decelerates immediately after the laser irradiation enters the corner, a command rate Fc(i2,1) at time i2 when the laser irradiation passes through the corner is F1/2, and a command rate Fc(i3,1) at time i3 reaches F1 as the laser scan rate accelerates again after the laser irradiation passes through the corner. Finally, the laser scan rate decelerates at a moving end part of the laser irradiation position and reaches a command rate 0, so that the movement of the laser irradiation position stops.

In this manner, command rates Fc(i,2) and Fc(i,3) per unit time for the second and third layers are similarly obtained as velocity waveforms like that illustrated in FIG. 6 by the machining program analyzing unit 101.

The deposition condition is adjusted so that the welding state is always within a stable range of the welding amount at the command rates Fc(i,k) (k=1, 2, 3) per unit time at the laser irradiation positions calculated as described above. Note that the operation of the machining program analyzing unit 101 may be such that program analysis processes for the first, second, and third layers and the processes of the command value generating unit 102, the data acquiring unit 103, the welding state determination unit 104, the deposition condition adjusting unit 105, and the deposition condition outputting unit 106 are performed at the same time.

(Command Value Generating Unit 102)

The command value generating unit 102 performs an interpolation process of computing coordinates of an interpolation point, which is a laser irradiation position per unit time when the laser irradiation position moves at a command rate Fc(i,k) after the smoothing process performed by the machining program analyzing unit 101, to generate coordinates of the interpolation point. The coordinates of the interpolation point is output every unit time to the machine tool 11, and the laser irradiation position is controlled to be a target position of the machine tool 11.

(Data Acquiring Unit 103)

The data acquiring unit 103 acquires data such as the temperature T(i,k) of a molten pool, which is the portion to be machined in the molten state, the laser output value P(i,k), and the metal material supply amount V(i,k) of metal powder or metal wire. In the first embodiment, the temperature T(i,k) of the molten pool of each layer is constant within the layer. The temperature T(i,k) of the molten pool satisfies the relation $T(i,3)>T(i,2)>T(i,1)$ since the temperature is higher as the position of a layer is higher with respect to the base material because of heat accumulation at the portion to be machined due to laser irradiation. The data acquired by the data acquiring unit 103 may be measurement values measured by sensors provided in the machine tool 11 or may be estimation values calculated by the data acquiring unit 103 by using estimated formulae.

(Welding State Determination Unit 104)

The welding state determination unit 104 determines whether deposition can be performed in a stable state when the laser irradiation moves at the command rate $Fc(i,k)$, on the basis of the temperature $T(i,k)$ of the molten pool, the laser output value $P(i,k)$ and the metal material supply amount $V(i,k)$ acquired by the data acquiring unit 103. The welding state determination unit 104 determines which of three welding states, which are a stable welding amount state, an insufficient welding amount state, and an excessive welding amount state, the metal material is.

For the determination on the welding state of the metal material, an index value $w1(i,k)$ expressed by the following formula (1) and an index value $w2(i,k)$ expressed by the following formula (2) are used.

$$w1(i,k)=P(i,k)/Fc(i,k) \quad (1)$$

$$w2(i,k)=V(i,k)/Fc(i,k) \quad (2)$$

Note that $w1(i,k)$ is an index value of laser irradiation amount at the molten pool, which is the laser irradiation position, and $w2(i,k)$ is an index value of a metal material supply amount at the molten pool, which is the laser irradiation position. $w1(i,k)$ is (the laser output value/the laser scan rate), and $w2(i,k)$ is (the metal material supply amount/the laser scan rate).

The welding state of the metal material is evaluated on the basis of the index values $w1(i,k)$ and $w2(i,k)$. For the determination on the welding state, evaluation formulae $W(w1,w2)$ expressed by formulae (3) to (5) are used.

$$W(w1,w2)=0, w1>\alpha1 \times w2+\beta1 \cap w1>\alpha3 \times w2+\beta3 \quad (3)$$

$$W(w1,w2)=1, \alpha2 \times w2+\beta2 < w1 < \alpha1 \times w2+\beta1 \quad (4)$$

$$W(w1,w2)=2, w1<\alpha2 \times w2+\beta2 \cap w1<\alpha3 \times w2+\beta3 \quad (5)$$

In the first embodiment, the welding state is determined to be the insufficient welding amount state when the evaluation formula is $W=0$, the welding state is determined to be the stable welding amount state when the evaluation formula is $W=1$, and the welding state is determined to be the excessive welding amount state when the evaluation formula is $W=2$. The ranges of $(w1,w2)$ on the right sides of the formulae (3) to (5) indicate an insufficient welding amount range, a stable welding amount range, and an excessive welding amount range, respectively. The values of the evaluation formulae W may be set to any value.

Figure 7:
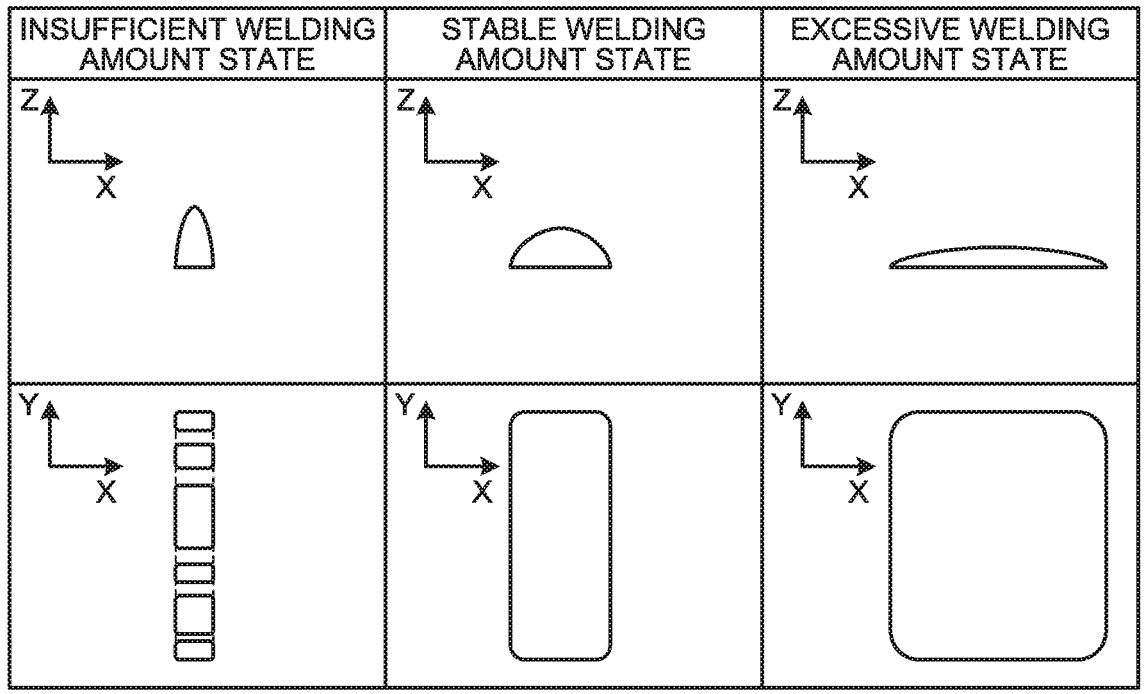
FIG. 7 is a diagram illustrating an example of layer shapes in a stable welding amount state, an insufficient welding amount state, and an excessive welding amount state according to the first embodiment.

FIG. 7 is a diagram illustrating an example of layer shapes in the stable welding amount state, the insufficient welding amount state, and the excessive welding amount state according to the first embodiment. Upper part of FIG. 7 illustrates the layer shapes in the three states as viewed in a Y direction, which is the laser scanning direction, and lower part of FIG. 7 illustrates the layer shapes in the three states as viewed in a Z direction, which is the laser irradiation direction. In FIG. 7, the stable welding amount state is a state in which deposition in a target shape can be obtained since the welding amount is appropriate, the insufficient welding amount state is a state in which welding is only partially completed since the welding amount is insufficient, and the excessive welding amount state is a state in which deposition results in a shape flatter than a target shape since the welding amount is excessive and welded metal material is carried away.

Figure 8:
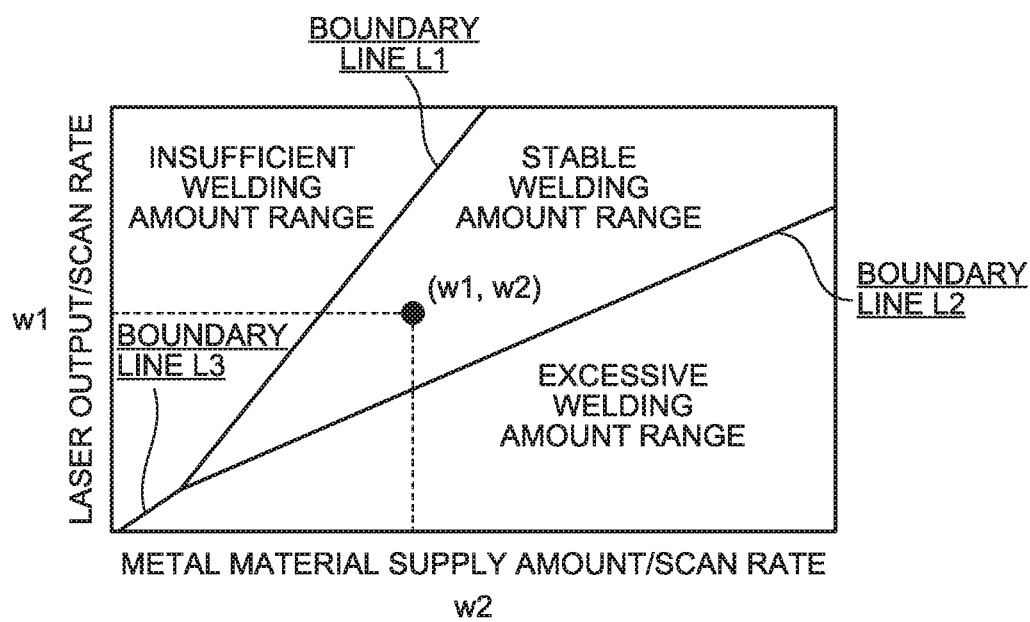
FIG. 8 is a diagram illustrating an example of a welding state transition diagram at a given molten pool temperature according to the first embodiment.

FIG. 8 is a diagram illustrating an example of a welding state transition diagram at a given molten pool temperature according to the first embodiment. The welding state transition diagram of FIG. 8 illustrates the welding states at a given molten temperature in a case where the vertical axis represents the index value $w1$ and the horizontal axis represents the index value $w2$. In FIG. 8, as the value of $w1/w2$ is smaller, the metal material supply amount with respect to the laser with which the portion to be machined is irradiated becomes more excessive, which results in the excessive welding amount state. In contrast, as the value of $w1/w2$ is larger, the metal material supply amount with respect to the laser with which the portion to be machined is irradiated becomes less sufficient, which results in the insufficient welding amount state.

In addition, in the welding state transition diagram in FIG. 8, boundary lines L1, L2, and L3 that divide the three states, which are the stable welding amount state, the insufficient welding amount state, and the excessive welding amount state, from one another change depending on the molten pool temperature measured by the data acquiring unit 103. Parameters for the boundary lines L1, L2, and L3 are stored in advance for each molten pool temperature in the welding state determination unit 104. Specifically, the parameters for the boundary lines L1, L2, and L3 are $\alpha1(T)$ and $\beta1(T)$, $\alpha2(T)$ and $\beta2(T)$, and $\alpha3(T)$ and $\beta3(T)$, which determine the ranges of the formulae (3) to (5). $\alpha1(T)$ and $\beta1(T)$ represent the slope and the intercept, respectively, of the boundary line L1 between the insufficient welding amount range and the stable welding amount range, $\alpha2(T)$ and $\beta2(T)$ represent the slope and the intercept, respectively, of the boundary line L2 between the excessive welding amount range and the stable welding amount range, and $\alpha3(T)$ and $\beta3(T)$ represent the slope and the intercept, respectively, of the boundary line L3 between the insufficient welding amount range and the excessive welding amount range.

In addition, the welding state determination unit 104 calculates $w1$ and $w2$ on the basis of the command rate $Fc(i,k)$, which is the laser scan rate determined by the machining program analyzing unit 101 by pre-reading the machining program 10, and the laser output value and the metal material supply amount measured by the data acquiring unit 103. The welding state determination unit 104 is further capable of obtaining the welding state transition diagram by using information on the boundary lines L1, L2, and L3 stored in advance on the basis of the molten pool temperature measured by the data acquiring unit 103. The welding state determination unit 104 determines the welding state on the basis of the obtained $w1$ and $w2$ and the welding state transition diagram.

Note that the parameters for the boundary lines change depending on the temperature T of the molten pool. Experiments of deposition under all possible conditions of the molten pool temperature, the laser output value, and the metal material supply amount are carried out in advance, so that the parameters for the boundary lines under a plurality of conditions are derived, and the derived parameters are stored in the storage unit 110 of the deposition condition control device 100. Alternatively, the parameters for the boundary lines may be estimated with a plurality of sets of deposition condition data stored in the storage unit 110, or the welding state transition diagram itself at each molten pool temperature may be stored instead of the parameters for the boundary lines at each molten pool temperature in the storage unit 110. The parameters for the boundary lines or the welding state transition diagram at each molten pool temperature may be stored in a storage unit included in the welding state determination unit 104 instead of the storage unit 110.

Figure 9:
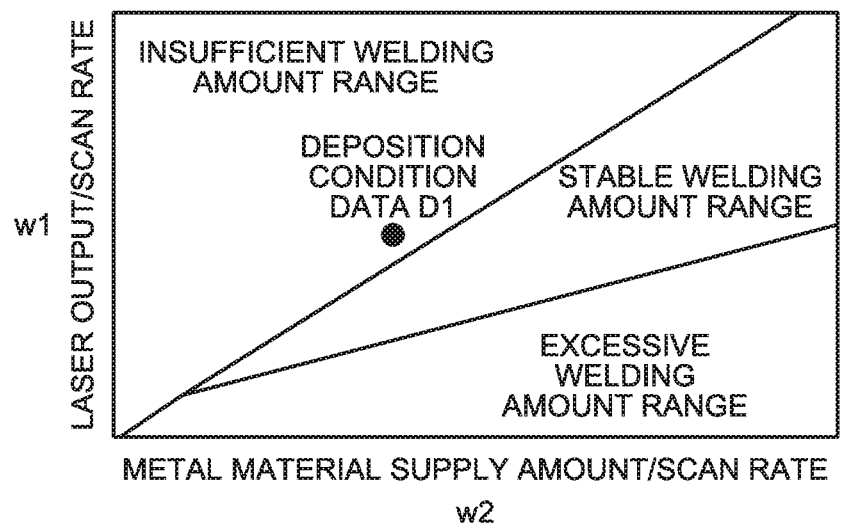
FIG. 9 is a diagram illustrating welding states of the first layer of the additively manufactured object according to the first embodiment.
Figure 10:
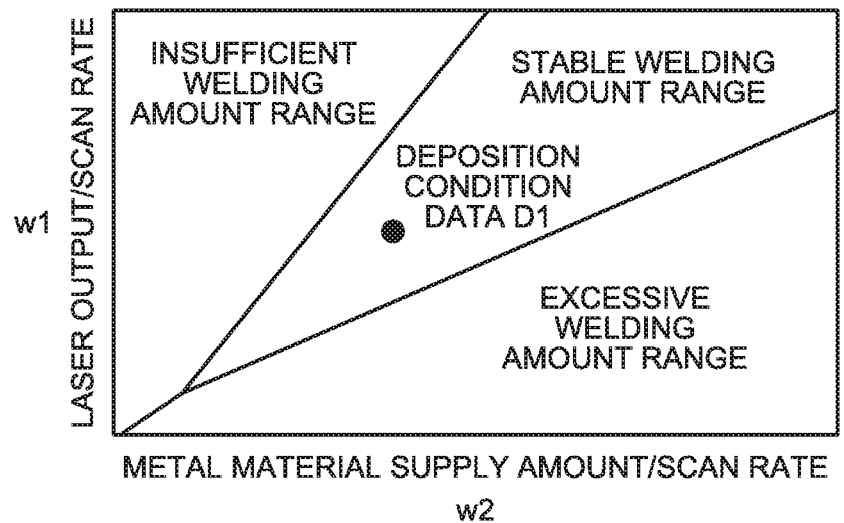
FIG. 10 is a diagram illustrating welding states of a second layer of the additively manufactured object according to the first embodiment.
Figure 11:
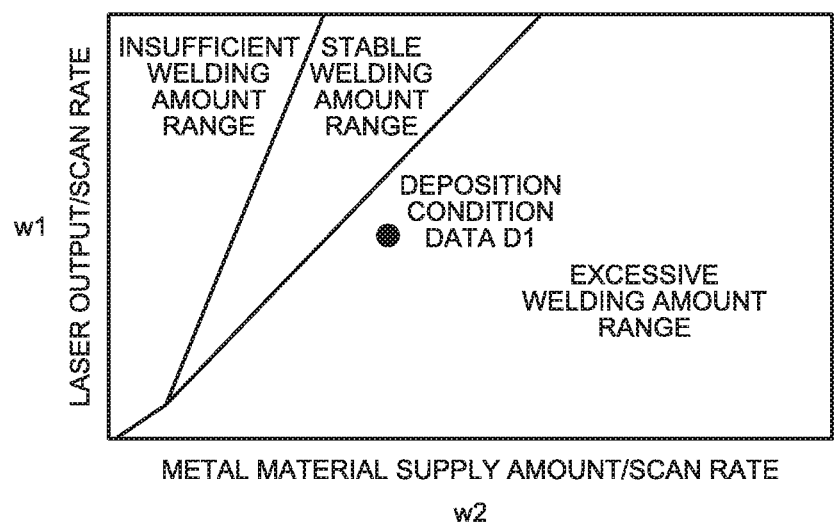
FIG. 11 is a diagram illustrating welding states of a third layer of the additively manufactured object according to the first embodiment.

FIG. 9 is a diagram illustrating the welding states of the first layer of the additively manufactured object according to the first embodiment. FIG. 10 is a diagram illustrating the welding states of the second layer of the additively manufactured object according to the first embodiment. FIG. 11 is a diagram illustrating the welding states of the third layer of the additively manufactured object according to the first embodiment.

FIGS. 9 to 11 each illustrate a welding state transition diagram at a molten pool temperature T(i,k) of the respective layers (k=1, 2, 3) in a case where only the deposition condition data D1 are used for deposition without adjustment of the deposition condition, and also indicate the which of the welding states the values of w1($i,k$) and w2($i,k$) correspond to in the welding state transition diagram.

At the first layer of FIG. 9, molten pool temperature data acquired by the data acquiring unit 103 is T(i,1), and the values of w1($i,k$) and w2($i,k$) are included in the insufficient welding amount range.

At the second layer of FIG. 10, since molten pool temperature T(i,2) acquired by the data acquiring unit 103 is affected by heat accumulation, the values of w1($i,k$) and w2($i,k$) are included in the stable welding amount range, unlike the first layer.

At the third layer of FIG. 11, since molten pool temperature T(i,3) acquired by the data acquiring unit 103 is more affected by heat accumulation than the second layer is, the values of w1($i,k$) and w2($i,k$) are included in the excessive welding amount range.

As described above, the welding states of the respective layers at time i in the machining program 10 illustrated in FIG. 2 are such that the first layer is in the insufficient welding amount state and the third layer is in the excessive welding amount state, which are the states in which deposition to target shapes cannot be achieved without adjustment of the deposition condition. In contrast, the second layer is in the stable welding amount state in which the deposition condition need not be adjusted.

(Deposition Condition Adjusting Unit 105)

The deposition condition adjusting unit 105 adjusts set values of the laser output value and the metal material supply amount on the basis of the welding states determined by the welding state determination unit 104. The deposition condition adjusting unit 105 adjusts the laser output set value and the metal material supply amount by changing the deposition condition data to be used from the set of deposition condition data specified by the machining program 10 or from outside to another set of deposition condition data stored in the storage unit 110. Note that the adjustment may be performed by constructing a model formula from six sets of deposition condition data stored in the storage unit 110 and deriving an appropriate laser output set value and an appropriate metal material supply amount.

In the deposition condition control device 100, when the stable welding amount state will not be achieved with the deposition condition data D1 specified in the machining program 10, sets of deposition condition data that include the same deposition height and deposition width as the deposition condition data D1 and with which deposition in the stable welding amount state can be achieved are extracted from the six sets of deposition condition data that are stored. One set of deposition condition data is then selected from the extracted sets of deposition condition data.

Figure 12:
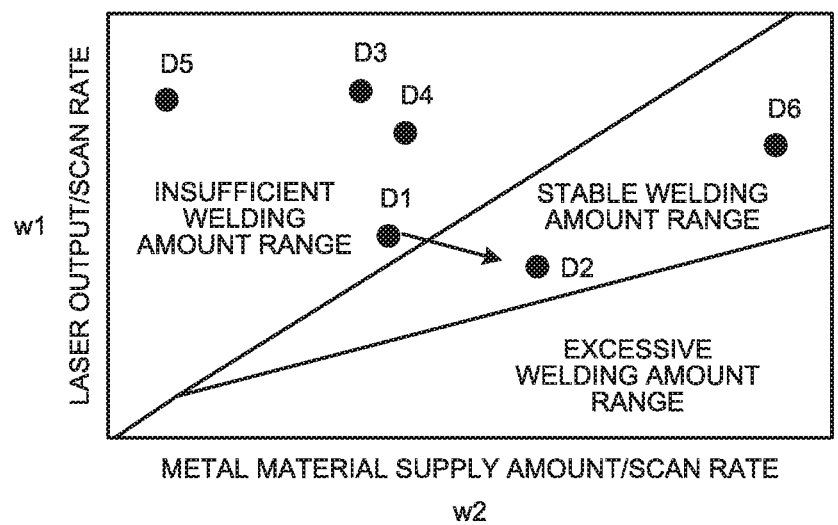
FIG. 12 is a diagram explaining adjustment from the insufficient welding amount state in the first embodiment.

As illustrated in FIG. 9, the welding state of the first layer of the additively manufactured object at time i when the deposition condition data D1 are used is determined to be the insufficient welding amount state by the welding state determination unit 104. FIG. 12 is a diagram explaining adjustment from the insufficient welding amount state in the first embodiment. FIG. 12 illustrates distribution of sets of deposition condition data stored in the storage unit 110 in the welding state transition diagram of the first layer at the molten pool temperature T(i,1) illustrated in FIG. 9. A dot D1 in FIG. 12 represents the values of w1($i,k$) and w2($i,k$) calculated on the basis of actual measurement data in a case where deposition is carried out using the deposition condition data D1. In contrast, dots D2 to D6 in FIG. 12 represent values obtained by assigning set values of the deposition condition data illustrated in FIG. 4 to P(i,k) and V(i,k) in the formulae (1) and (2).

In FIG. 12, there is only one set of deposition condition data D2 that includes the same deposition height and deposition width as D1 and meets the condition that the stable welding amount state will be achieved in the sets of deposition condition data other than D1 stored in the deposition condition control device 100. The deposition condition adjusting unit 105 thus selects the deposition condition data D2.

The deposition condition adjusting unit 105 further adjusts the laser output value Pc(i,k) and the metal material supply amount Vc(i,k) depending on the laser scan rate obtained by the machining program analyzing unit 101 as expressed by the following formulae (6) and (7) on the basis of the selected deposition condition data.

$$Pc(i,k)=(Fc(i,k)/F) \times P + Po \quad (6)$$

$$Vc(i,k)=(Fc(i,k)/F) \times V + Vo \quad (7)$$

P, V, and F in the formulae (6) and (7) represent the laser output value, the metal material supply amount, and the laser scan rate, respectively, described in the selected deposition condition data. Po and Vo represent offset values for adjustment, which are assumed to be 0 in the description below.

As illustrated in FIG. 12, for the first layer at time i, the deposition condition data D2 in FIG. 4 are selected. Thus, the laser output value Pc(i,1)=(Fc(i,1)/F2)×P2 is obtained by using the formula (6), and the metal material supply amount Vc(i,1)=(Fc(i,1)/F2)×V2 is obtained by using the formula (7).

Thus, the laser output values Pc(i,1) and the metal material supply amounts Vc(i,1) at the corner-shaped portion of the first layer illustrated in FIG. 5 at time i1, time i2, and time i3 are (Pc(i1,1),Vc(i1,1))=(F1/F2×P2,F1/F2×V2), (Pc(i2,1),Vc(i2,1))=(F1/F2×P2/2,F1/F2×V2/2), and (Pc(i3,1),Vc(i3,1))=(F1/F2×P2,F1/F2×V2), respectively. At time i2, the laser output value and the metal material supply amount are ½ times those at time i1 and time i3.

Subsequently, as illustrated in FIG. 10, the welding state of the second layer of the additively manufactured object at time i when the deposition condition data D1 are used is determined to be the stable welding amount state by the welding state determination unit 104. Thus, the deposition condition data D1 specified in the machining program need not be changed. The laser output value Pc(i,2) and the metal material supply amount Vc(i,2) depending on the laser scan rate for the second layer at time i in this case are obtained by substituting the laser output value, the metal material supply amount, and the laser scan rate described in the specified deposition condition data D1 into the formulae (6) and (7). As a result, the laser output value $Pc(i,2)=(Fc(i,1)/F1) \times P1$ and the metal material supply amount $Vc(i,2)=(Fc(i,1)/F1) \times V1$ are obtained.

Figure 13:
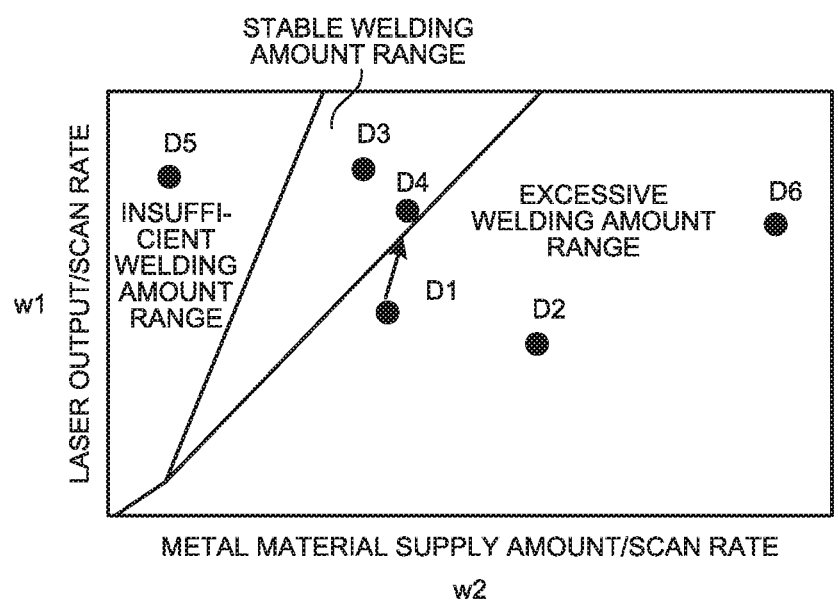
FIG. 13 is a diagram explaining adjustment from the excessive welding amount state in the first embodiment.

Furthermore, as illustrated in FIG. 11, the welding state of the third layer of the additively manufactured object at time i when the deposition condition data D1 are used is determined to be the excessive welding amount state by the welding state determination unit 104. FIG. 13 is a diagram explaining adjustment from the excessive welding amount state in the first embodiment. FIG. 13 illustrates distribution of sets of deposition condition data stored in the storage unit 110 in the welding state transition diagram of the third layer at the molten pool temperature $T(i,3)$ illustrated in FIG. 11. A dot D1 in FIG. 13 represents the values of $w1(i,k)$ and $w2(i,k)$ calculated on the basis of actual measurement data in a case where deposition is carried out using the deposition condition data D1. In contrast, dots D2 to D6 in FIG. 13 represent values obtained by assigning set values of the deposition condition data illustrated in FIG. 4 to $P(i,k)$ and $V(i,k)$ in the formulae (1) and (2).

In FIG. 13, there are a plurality of sets of deposition condition data that include the same deposition height and deposition width as D1 and meet the condition that the stable welding amount state will be achieved in the sets of deposition condition data other than D1 stored in the deposition condition control device 100, which are two sets of deposition condition data D3 and D4. In the case where there are a plurality of sets of deposition condition data that meet the above condition, one may be selected therefrom. In the first embodiment, the deposition condition adjusting unit 105 selects the deposition condition data D4, which is closer to the deposition condition data D1 specified in the machining program 10 in the welding state transition diagram of FIG. 13. The deposition condition data at a shorter distance u is selected so that the changes of the laser output value and the metal material supply amount will be smaller.

The deposition condition adjusting unit 105 further obtains the laser output value $Pc(i,3)$ and the metal material supply amount $Vc(i,3)$ for the third layer at time i on the basis of the selected deposition condition data D4 in FIG. 4. Thus, the laser output value $Pc(i,3)=(Fc(i,3)/F4) \times P4$ is obtained by using the formula (6), and the metal material supply amount $Vc(i,3)=(Fc(i,1)/F4) \times V4$ is obtained by using the formula (7)

(Deposition Condition Outputting Unit 106)

The deposition condition outputting unit 106 outputs the laser output value $Pc(i,k)$ and the metal material supply amount $Vc(i,k)$ adjusted by the deposition condition adjusting unit 105 to the machine tool 11 at the same time as the coordinates of an interpolation point, which is a laser irradiation position, are output from the command value generating unit 102 to the machine tool 11 at time i of the k-th layer.

Setting the timings of laser irradiation and metal material supply by using M codes, G codes, parameters, or the like in the machining program 10 to any timings allows the laser irradiation and the metal material supply to be started at appropriate timings without being limited to the timing of start of axial movement.

Figure 14:
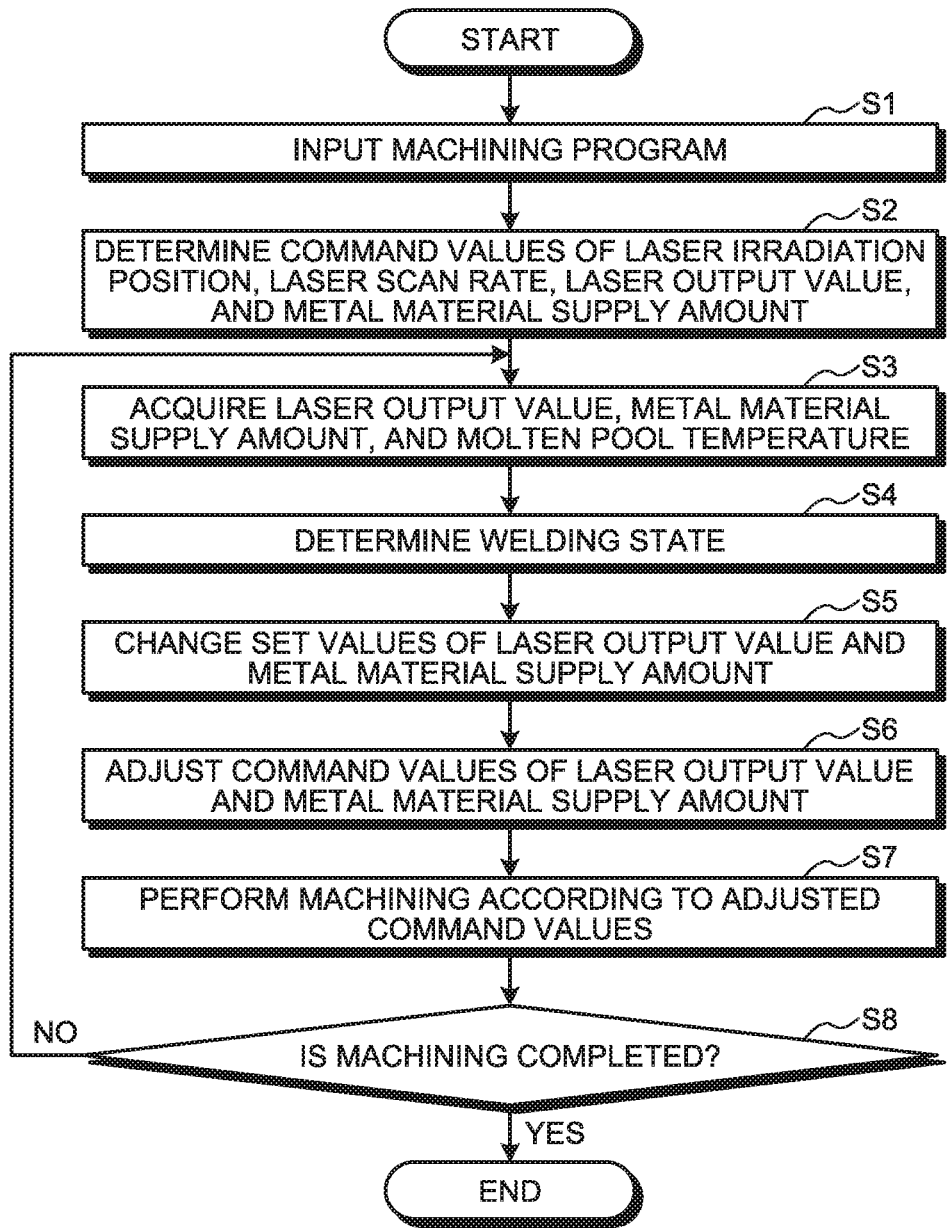
FIG. 14 is a flowchart explaining operation of the deposition condition control device according to the first embodiment.

Hereinafter, the operation of the deposition condition control device 100 will be explained. FIG. 14 is a flowchart explaining the operation of the deposition condition control device 100 according to the first embodiment.

First, a machining program 10 in which a movement command and a laser scan rate command necessary for moving an object to be machined or the laser irradiation position along a preset path, a laser output command value necessary for performing additive manufacturing at a target deposition height and a target deposition width, and a metal material supply amount command value are described are input to the machining program analyzing unit 101 from outside (step S1).

The movement command for the laser irradiation position is specified by coordinate values described in the machining program 10 and a movement mode is specified by G codes such as G0 and G1. The laser scan rate command is specified by F codes describing a velocity value in the machining program 10.

After step S1, the machining program analyzing unit 101 pre-reads the machining program 10 to analyze a programmed shape of an additively manufactured object, and determines command values of the laser irradiation position and the laser scan rate $Fc(i,k)$ at the laser irradiation position to be used for additive manufacturing. In addition, the machining program analyzing unit 101 determines a command value of the laser output value and a command value of the metal material supply amount necessary for the additive manufacturing on the basis of the deposition condition data specified in the machining program 10 (step S2). Note that the operation in step S2 may be performed simultaneously with the operations in step S3 and subsequent steps.

After step S2, the data acquiring unit 103 acquires data of the laser output value $P(i,k)$, the metal material supply amount $V(i,k)$, and the molten pool temperature $T(i,k)$ per unit time for machining of the k-th layer (step S3). The data may be measurement values obtained by using sensors, or may be estimation values calculated by using estimated formulae. In a case where measurement values obtained by using sensors are used, machining for the metal additive manufacturing is started between the end of step S1 and the start of step S3.

After step S3, the welding state determination unit 104 determines the welding state of the welding amount of the metal material when the additive manufacturing is performed or to be performed at the laser scan rate $Fc(i,k)$ determined by the machining program analyzing unit 101 (step S4). The welding state determination unit 104 determines the welding state from the three welding states, which are the stable welding amount state, the insufficient welding amount state, and the excessive welding amount state. The welding state determination unit 104 calculates w1 and w2 from the laser scan rate $Fc(i,k)$ determined in step S2 and the laser output value $P(i,k)$ and the metal material supply amount $V(i,k)$ acquired in step S3. The welding state determination unit 104 then determines the welding state on the basis of the position of w1 and w2 in the welding state transition diagram at the molten pool temperature $T(i,k)$ acquired in step S3.

After step S4, the deposition condition adjusting unit 105 changes the set value of the laser output value and the set value of the metal material supply amount on the basis of the welding state determined by the welding state determination unit 104 (step S5). When the welding state is determined to be the insufficient welding amount state or the excessive welding amount state by the welding state determination unit 104, the deposition condition adjusting unit 105 changes the set value of the laser output value and the set value of the metal material supply amount so that the result of determination by the welding state determination unit 104 with the target deposition height and the target deposition width will be the stable welding amount state. The deposition condition adjusting unit 105 changes the set value of the laser output value and the set value of the metal material supply amount by maintaining the deposition height and the deposition width in the deposition condition data specified by the machining program 10 or from outside and changing the other deposition condition data that are different conditions to be used for another set of deposition condition data.

After step S5, the deposition condition adjusting unit 105 adjusts the command value of the laser output value and the command value of the metal material supply amount depending on the laser scan rate at the laser irradiation position while maintaining the specified deposition height and deposition width on the basis of the set value of the laser output value and the set value of the metal material supply amount changed in step S5 (step S6).

After step S6, the deposition condition outputting unit 106 outputs the command value of the laser output value and the command value of the metal material supply amount adjusted depending on the laser scan rate to the machine tool 11, so that the laser irradiation and the metal material supply onto the portion to be machine is carried out and machining is performed by the machine tool 11 (step S7). Note that output of the adjusted command value of the laser output value and the adjusted command value of the metal material supply amount to the machine tool 11 by the deposition condition outputting unit 106 is performed at the same time as output of the command value of the laser irradiation position and the command value of the laser scan rate Fc(i,k) at the laser irradiation position obtained by the machining program analyzing unit 101 to the machine tool 11 by the command value generating unit 102.

As a result of step S7, the portion to be machined is molten and forms a molten pool, to which the metal material is supplied at a specified rate. After a lapse of certain time, the molten pool is resolidified with deposited metal, which forms the additively manufactured object having the target deposition height and the target deposition width.

After step S7, the deposition condition control device 100 determines whether or not machining is completed (step S8). If it is determined that machining is not completed (step S8: No), the operation moves to step S3 in which the operation described above is performed for the layer next to the k-th layer. If it is determined that machining is completed (step S8: Yes), the deposition condition control device 100 terminates the operation.

As described above, the deposition condition control device 100 according to the first embodiment maintains a specified deposition height and a specified deposition width and adjusts the laser output value and the metal material supply amount in view of the welding state of the metal material at the temperature of the molten pool so that additive manufacturing will always be performed. As a result, a target layer shape is achieved with high accuracy.

Second Embodiment

Figure 15:
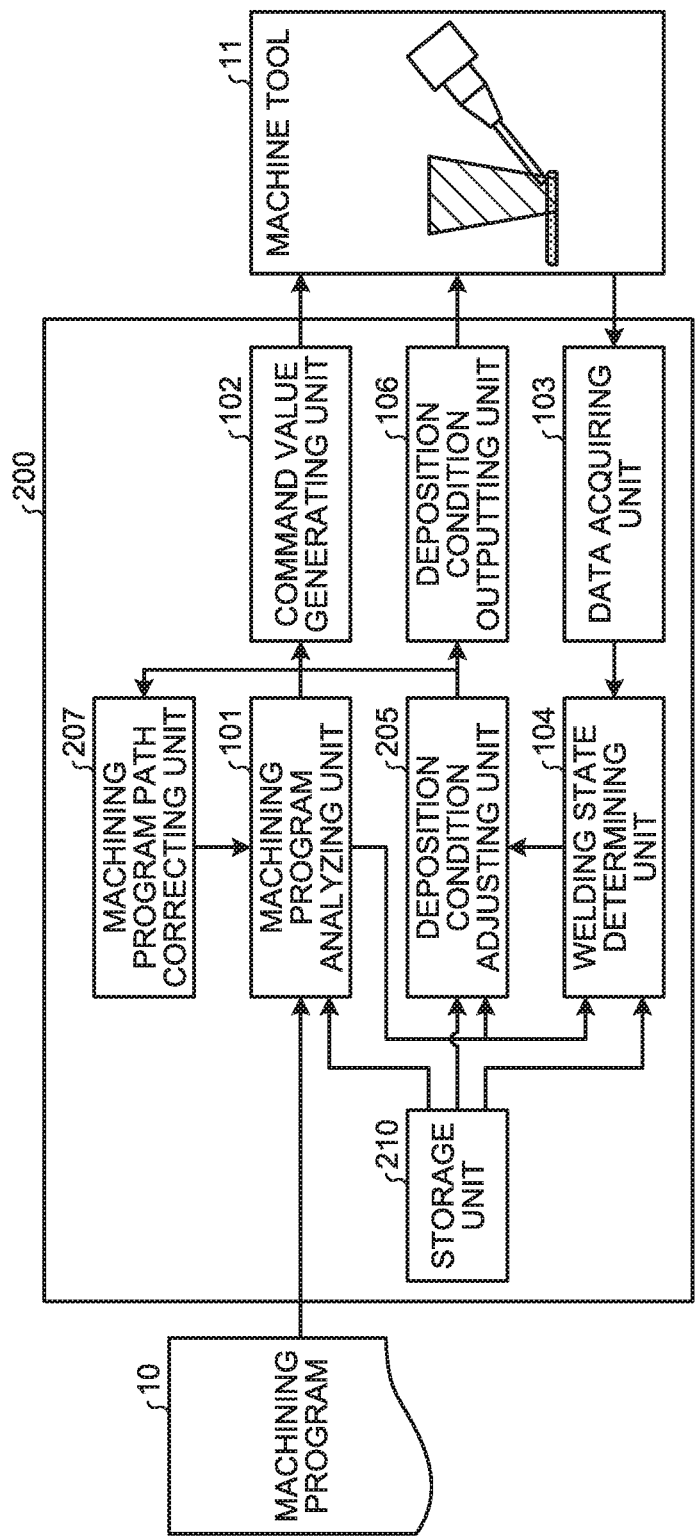
FIG. 15 is a diagram illustrating a configuration of a deposition condition control device according to a second embodiment of the present invention.

FIG. 15 is a diagram illustrating a configuration of a deposition condition control device 200 according to a second embodiment of the present invention. The deposition condition control device 200 illustrated in FIG. 15 is a numerical control device that controls the machine tool 11, which is an NC machine tool for additive manufacturing, by outputting a movement command, which is a group of interpolation points per unit time, a laser output command, and a supply amount command of a metal material such as metal powder or metal wire according to the machining program 10 input from outside. A deposition condition adjusting unit 205 of the deposition condition control device 200 is different from the deposition condition adjusting unit 105 in FIG. 1 in the operation, and deposition condition data stored in the storage unit 210 of the deposition condition control device 200 are different from the deposition condition data stored in the storage unit 110 in FIG. 1. FIG. 16 is a table illustrating six sets of deposition condition data D1 to D6 stored in the storage unit 210 according to the second embodiment. Furthermore, the deposition condition control device 200 additionally includes a machining program path correcting unit 207. The other components, however, are the same as those in the deposition condition control device 100, and operate similarly to those in the first embodiment. The machining program path correcting unit 207 obtains a path that corrects a difference between an actual layer shape resulting from adjustment of the deposition condition by the deposition condition adjusting unit 205 and a target layer shaped.

The machining program 10 input to the machining program analyzing unit 101 from outside is the same as that in FIG. 2 of the first embodiment, which performs deposition by moving the laser irradiation area in a corner shape, and stacks three layers of the deposition results upwards. A target deposition height and a target deposition width specified by the machining program or from outside are represented by h and d, respectively.

In addition, similarly to the first embodiment, the welding states of the respective layers of in the machining program 10 are such that the first layer is in the insufficient welding amount state and the third layer is in the excessive welding amount state, which are the states in which deposition to target shapes cannot be achieved without adjustment of the deposition condition, and the second layer is in the stable welding amount state in which adjustment of the deposition condition is not needed.

The target deposition height h, the target deposition width d, the laser output value P1, which is a deposition condition for achieving deposition with the deposition height h and the deposition width d, the metal material supply amount V1, and the laser scan rate F1 under these conditions constitute deposition condition data D1. An N104 block of the machining program 10 illustrated in FIG. 2 specifies selecting the deposition condition data D1.

(Deposition Condition Adjusting Unit 205)

The deposition condition adjusting unit 205 adjusts set values of the laser output value and the metal material supply amount on the basis of the welding states determined by the welding state determination unit 104. The deposition condition control device 200 according to the second embodiment adjusts the laser output set value and the metal material supply amount by changing the deposition condition data specified by the machining program 10 to another set of deposition condition data stored in the storage unit 210. Note that the adjustment may be performed by constructing a model formula from six sets of deposition condition data stored in the storage unit 210 and deriving an appropriate laser output set value and an appropriate metal material supply amount.

The deposition condition adjusting unit 205 extracts one or more sets of deposition condition data with which deposition in the stable welding amount state can be achieved from six sets of deposition condition data stored in the storage unit 210 and selects one set of deposition condition data from the extracted sets of deposition condition data when changing the deposition condition data on the basis of the welding state determined by the welding state determination unit 104.

First, other sets of deposition condition data with which deposition in the stable welding amount state can be achieved are extracted. Subsequently, sets of deposition condition data including the same deposition height and deposition width as those in the current set of deposition condition data are extracted. When no set of deposition condition data including the same deposition height and deposition width is present, the condition of the same deposition height and deposition width is removed in selecting sets of deposition condition data as long as deposition in the stable welding amount state can be achieved.

In the second embodiment, in a case where the current deposition condition data will result in an instable welding amount state, the deposition condition adjusting unit 205 selects such a set of deposition condition data in which the deposition width is not changed and the deposition height is smaller than the target deposition height. As a result, the actual deposition height in machining becomes smaller than the specified target deposition height. In a case where the current condition data will result in the excessive welding amount state, the deposition condition adjusting unit 205 selects such a set of deposition condition data in which the deposition height is not changed and the deposition width is smaller than the target deposition width. As a result, the actual deposition width in machining becomes smaller than the specified target deposition width. Hereinafter, specific explanation will be provided.

Figure 17:
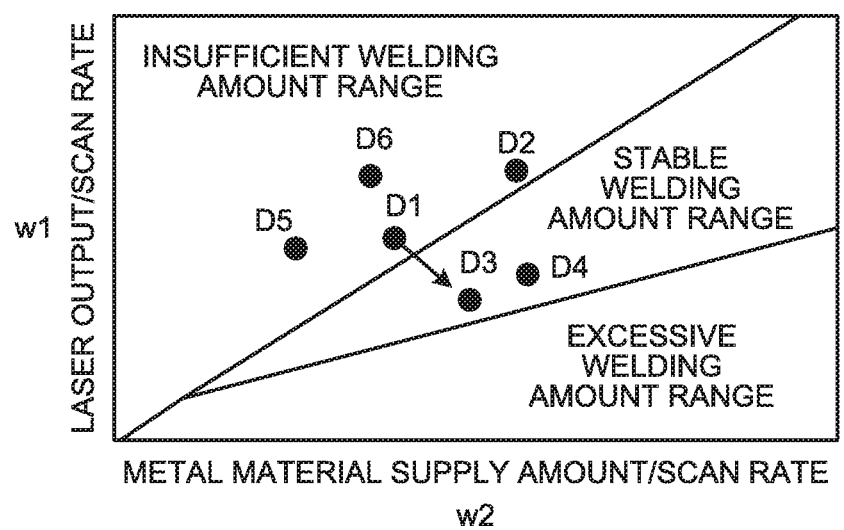
FIG. 17 is a diagram explaining adjustment from an insufficient welding amount state in the second embodiment.

As illustrated in FIG. 9, the welding state of the first layer of the additively manufactured object at time i when the deposition condition data D1 are used is determined to be the insufficient welding amount state by the welding state determination unit 104. FIG. 17 is a diagram explaining adjustment from the insufficient welding amount state in the second embodiment. FIG. 17 illustrates distribution of sets of deposition condition data stored in the storage unit 210 in the welding state transition diagram of the first layer at the molten pool temperature $T(i,1)$ illustrated in FIG. 9. A dot D1 in FIG. 17 represents the values of $w1(i,k)$ and $w2(i,k)$ calculated on the basis of actual measurement data in a case where deposition is carried out using the deposition condition data D1. In contrast, dots D2 to D6 in FIG. 17 represent values obtained by assigning set values of the deposition condition data illustrated in FIG. 16 to $P(i,k)$ and $V(i,k)$ in the formulae (1) and (2).

FIG. 17 illustrates the welding state transition diagram of the first layer at the molten pool temperature $T(i,1)$ together with distribution of sets of deposition condition data of FIG. 16 stored in the storage unit 210. According to FIGS. 16 and 17, there is no set of deposition condition data with which deposition in the stable welding amount state with the same deposition height and deposition width as those in the target deposition condition data D1 is present in the six sets of deposition condition data stored in the storage unit 210. Thus, the deposition condition adjusting unit 205 selects such sets of deposition condition data in which the deposition width is not changed and the deposition height is smaller than that in the target deposition condition data D1 from sets of deposition condition data present within the stable welding amount range. Two sets of deposition condition data are selected here, which are deposition condition data D3 and D4.

In a case where a plurality of such sets of deposition condition data are present, one set may be selected therefrom. The deposition condition adjusting unit 205 selects such a set of deposition condition data in which the target deposition height is a deposition height obtained by equally dividing the deposition height in the current deposition condition data D1 by an integer N. The deposition height in the set of deposition condition data selected here is the actual deposition height in machining. Note that N is any integer, and a smallest possible value of N is selected so that the difference between the target layer shape and the actual deposition height will be small.

The deposition condition adjusting unit 205 selects the set of deposition condition data as described above so that the machining program path correcting unit 207 can extract a difference path from a target layer shape, and that deposition can be divided into a plurality of times of deposition by using the deposition condition data that are currently selected by the deposition condition adjusting unit 205 when additive manufacturing is carried out again.

According to FIGS. 16 and 17, there is only one set of deposition condition data that meets the condition, which is the deposition condition data D3, in which the deposition height is h/2 and the deposition width is d.

The deposition condition adjusting unit 205 further adjusts the laser output value $Pc(i,k)$ and the metal material supply amount $Vc(i,k)$ depending on the laser scan rate by using the formulae (6) and (7) on the basis of the selected deposition condition data D3.

Subsequently, as illustrated in FIG. 10, the welding state of the second layer of the additively manufactured object at time i when the deposition condition data D1 are used is determined to be the stable welding amount state by the welding state determination unit 104. Thus, the deposition condition data D1 specified in the machining program need not be changed. Adjustment of the laser output value $Pc(i,2)$ and the metal material supply amount $Vc(i,2)$ depending on the laser scan rate for the second layer at time i in this case is achieved by substituting the laser output value, the metal material supply amount, and the laser scan rate described in the specified deposition condition data D1 into the formulae (6) and (7).

Figure 18:
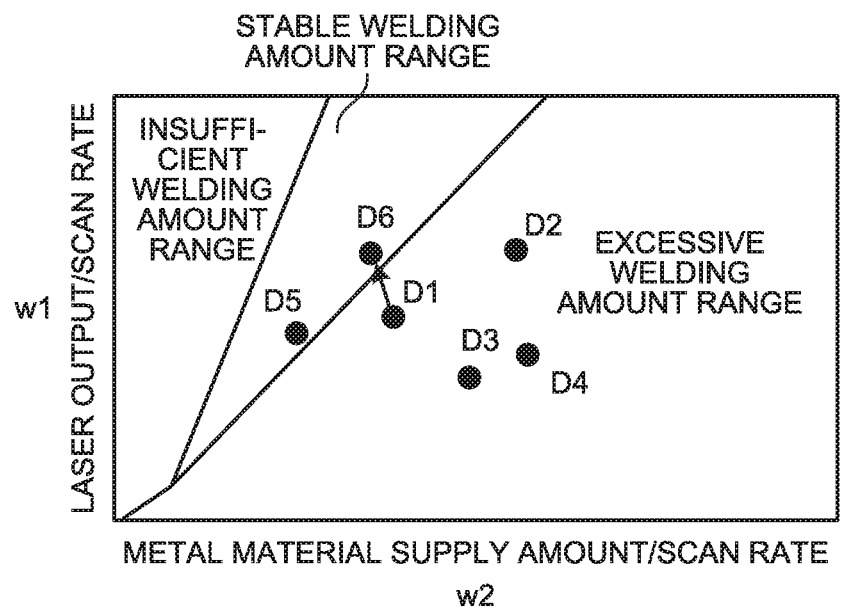
FIG. 18 is a diagram explaining adjustment from an excessive welding amount state in the second embodiment.

Furthermore, as illustrated in FIG. 11, the welding state of the third layer of the additively manufactured object at time i when the deposition condition data D1 are used is determined to be the excessive welding amount state by the welding state determination unit 104. FIG. 18 is a diagram explaining adjustment from the excessive welding amount state in the second embodiment. FIG. 18 illustrates distribution of sets of deposition condition data stored in the storage unit 210 in the welding state transition diagram of the third layer at the molten pool temperature $T(i,3)$ illustrated in FIG. 11. According to FIGS. 16 and 18, there is no set of deposition condition data with which deposition in the stable welding amount state with the same deposition height and deposition width as those in the target deposition condition data D1 is present in the six sets of deposition condition data stored in the storage unit 210. Thus, the deposition condition adjusting unit 205 selects such sets of deposition condition data in which the deposition height is not changed and the deposition width is smaller than that in the target deposition condition data D1 from sets of deposition condition data present within the stable welding amount range. Two sets of deposition condition data are selected here, which are deposition condition data D5 and D6.

In a case where a plurality of such sets of deposition condition data are present, one set may be selected therefrom. The deposition condition adjusting unit 205 selects such a set of deposition condition data in which the target deposition width is a deposition width obtained by equally dividing the deposition width in the current deposition condition data D1 by an odd number (2M−1). The deposition width in the set of deposition condition data selected here is the actual deposition width in machining. Note that M is any integer, and a smallest possible value of M is selected so that the difference between the target layer shape and the actual deposition width will be small.

The deposition condition adjusting unit 205 selects the set of deposition condition data as described above so that the machining program path correcting unit 207 can extract a difference path from a target layer shape, and that deposition can be divided into a plurality of times of deposition by using the deposition condition data that are currently selected by the deposition condition adjusting unit 205 when additive manufacturing is carried out again.

According to FIGS. 16 and 18, the deposition condition data that meet the condition are the deposition condition data D6, in which the deposition height is h and the deposition width is d/3.

In addition, similarly to the first embodiment, the deposition condition adjusting unit 205 may specify a set of deposition condition data that is closest to the deposition condition data specified in the machining program 10 in the welding state transition diagram of FIG. 18 so that the changes of the laser output value and the metal material supply amount will be small.

The deposition condition adjusting unit 205 further adjusts the laser output value $Pc(i,k)$ and the metal material supply amount $Vc(i,k)$ depending on the laser scan rate by using the formulae (6) and (7) on the basis of the selected deposition condition data D6.

(Machining Program Path Correcting Unit 207)

To correct the difference from the target layer shape caused by adjustment of the set value of the laser output value and the set value of the metal material supply amount by the deposition condition adjusting unit 205, the machining program path correcting unit 207 generates a command path for deposition divided into a plurality of times of deposition to obtain a target shape and outputs the command path to the machining program analyzing unit 101. Note that the machining program path correcting unit 207 divides a machining program shape of each specified range, and estimates a difference path is estimated for the resulting portions as a group by the machining program 10 or parameters. Ranges in which specific command codes among such command codes as G codes and M codes in the machining program 10 are valid or invalid may be grouped, ranges in which a specific character string is included or not included in the machining program may be grouped, or ranges in which the same deposition condition data are specified by the deposition condition adjusting unit 205 among the specified ranges may be grouped. A specific example of the specified ranges is the respective layers.

The machining program path correcting unit 207 generates a command path of a difference path for correcting the difference from the target deposition height or the target deposition width for portions sandwiched by G0 commands described in the machining program 10 illustrated in FIG. 2 as a group. In other words, the machining program path correcting unit 207 calculates a command path of a different path for correcting the difference between the specified target deposition height and the actual deposition height, or a command path of a difference path for correcting the difference between the specified target deposition width and the actual deposition width. Specifically, the command path of the difference path is calculated from the deposition condition data specified by the machining program 10 and the deposition condition data resulting from the change by the deposition condition adjusting unit 205. As a result, the command path for correcting the difference for each layer is calculated.

Figure 19:
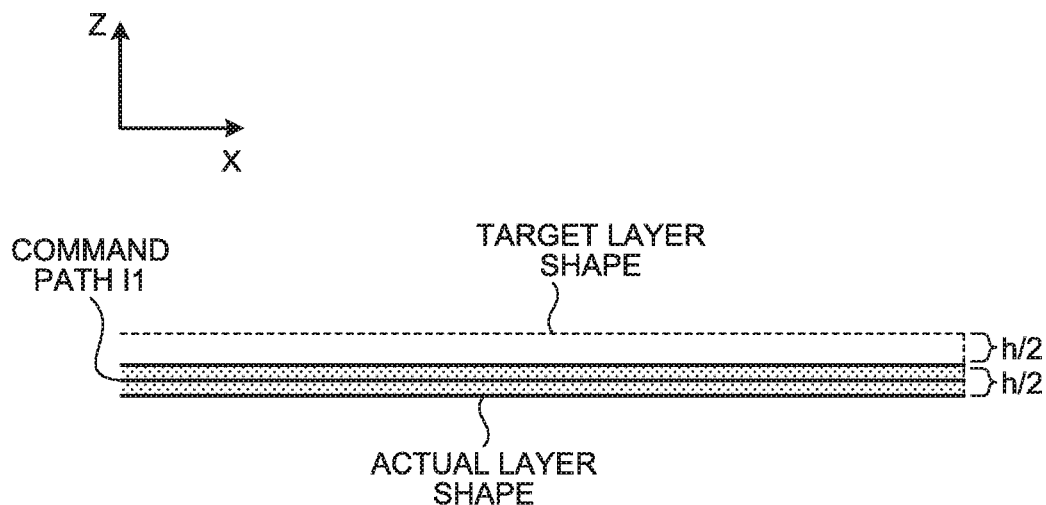
FIG. 19 is an XZ plane view illustrating a target layer shape and an actual layer shape of a first layer according to the second embodiment.

Owing to the influence of the change in the deposition conditions specified by the deposition condition adjusting unit 205, deposition is carried out in a shape at ½ times the target deposition height at the first layer. FIG. 19 is an XZ plane view illustrating a difference between the target layer shape and the actual layer shape of the first layer according to the second embodiment. As illustrated in FIG. 19, a difference corresponding to the movement path of the laser irradiation position with a width d and a height h/2 in the Z direction, which is the height direction of the deposition portion, is caused between the target layer shape and the actual layer shape formed along a command path l1.

Figure 20:
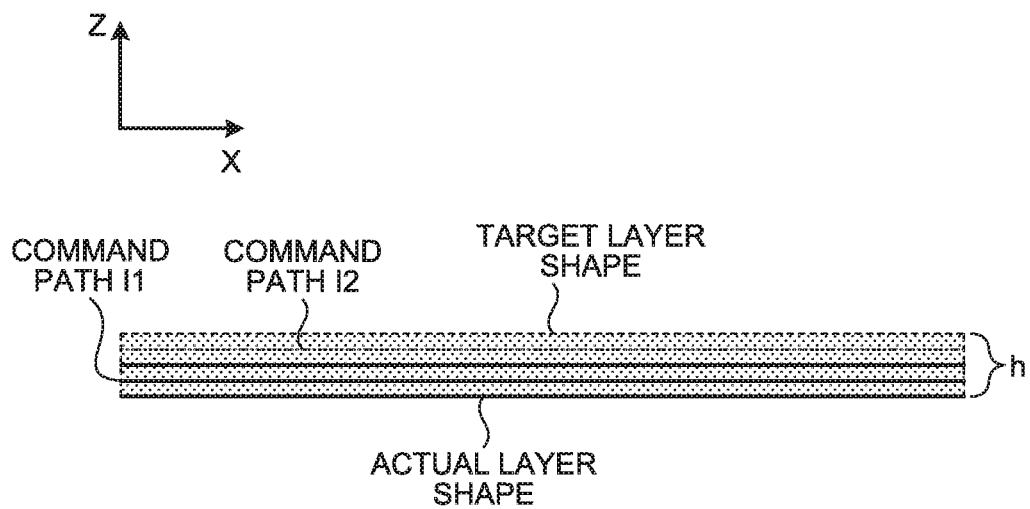
FIG. 20 is a diagram illustrating a difference path for correcting the difference between the target layer shape and the actual layer shape of the first layer according to the second embodiment.

FIG. 20 is a diagram illustrating a difference path for correcting the difference between the target layer shape and the actual layer shape of the first layer according to the second embodiment. The machining program path correcting unit 207 calculates a command path l2, which is a difference path deviated by h/2 in the Z-axis direction from the command path l1 and outputs the command path l2 to the machining program analyzing unit 101, so that the machine tool 11 can carry out additive manufacturing in two times on command paths l1 and l2.

In this process, deposition on the command path l2, which is the difference path, is with the width d and the height h/2 by using the laser output value and the metal material supply amount in the deposition condition data D3 similarly to the command path l1. As a result, the difference between the target layer shape and the actual layer shape caused by the change in the deposition condition data can be corrected, and the target layer shape with the deposition width d and the deposition height h can ultimately be formed.

Figure 21:
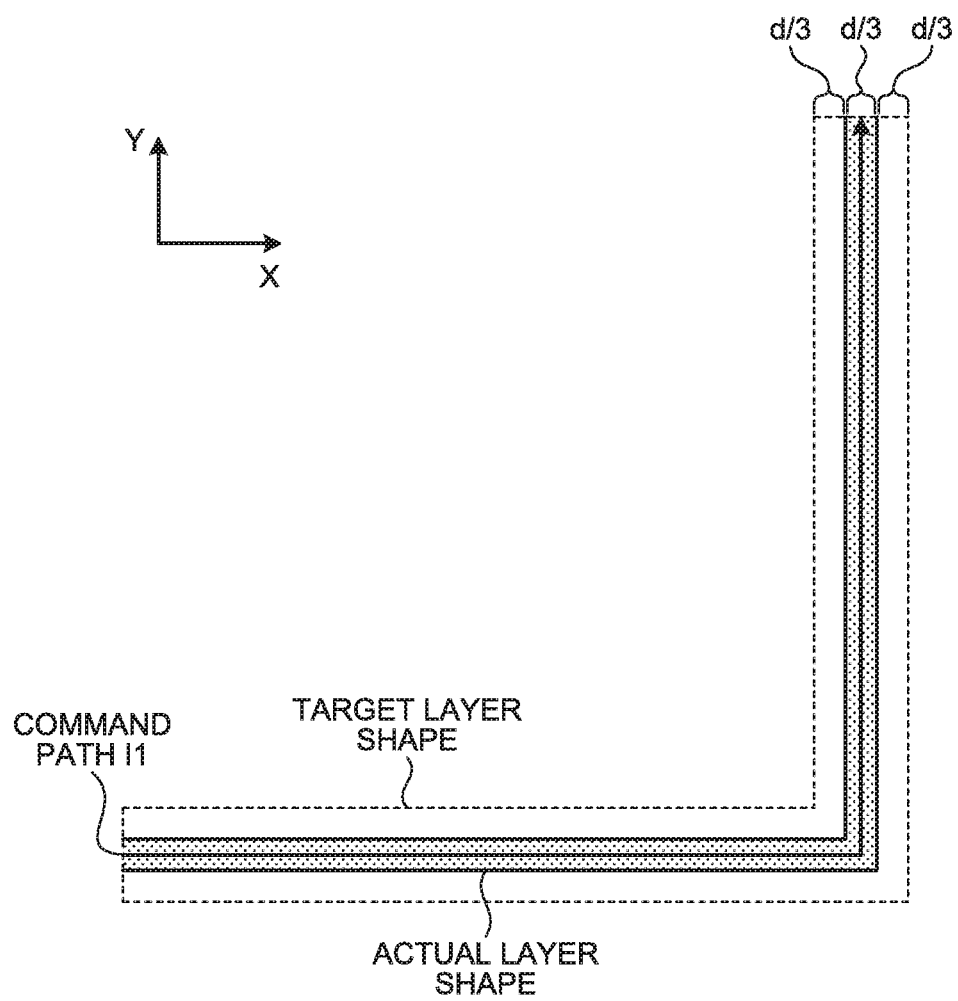
FIG. 21 is an XY plane view illustrating a difference between a target layer shape and an actual layer shape of the third layer according to the second embodiment.

Owing to the influence of the change in the deposition conditions specified by the deposition condition adjusting unit 205, deposition is carried out in a shape at ⅓ times the target deposition width at the third layer. FIG. 21 is an XY plane view illustrating a difference between the target layer shape and the actual layer shape of the third layer according to the second embodiment. As illustrated in FIG. 21, a difference corresponding to the movement path of the laser irradiation position with a width d/3 and a height h on respective sides in the Y direction, which is the width direction of the deposition portion, is caused between the target layer shape and the actual layer shape formed along a command path l1.

Figure 22:
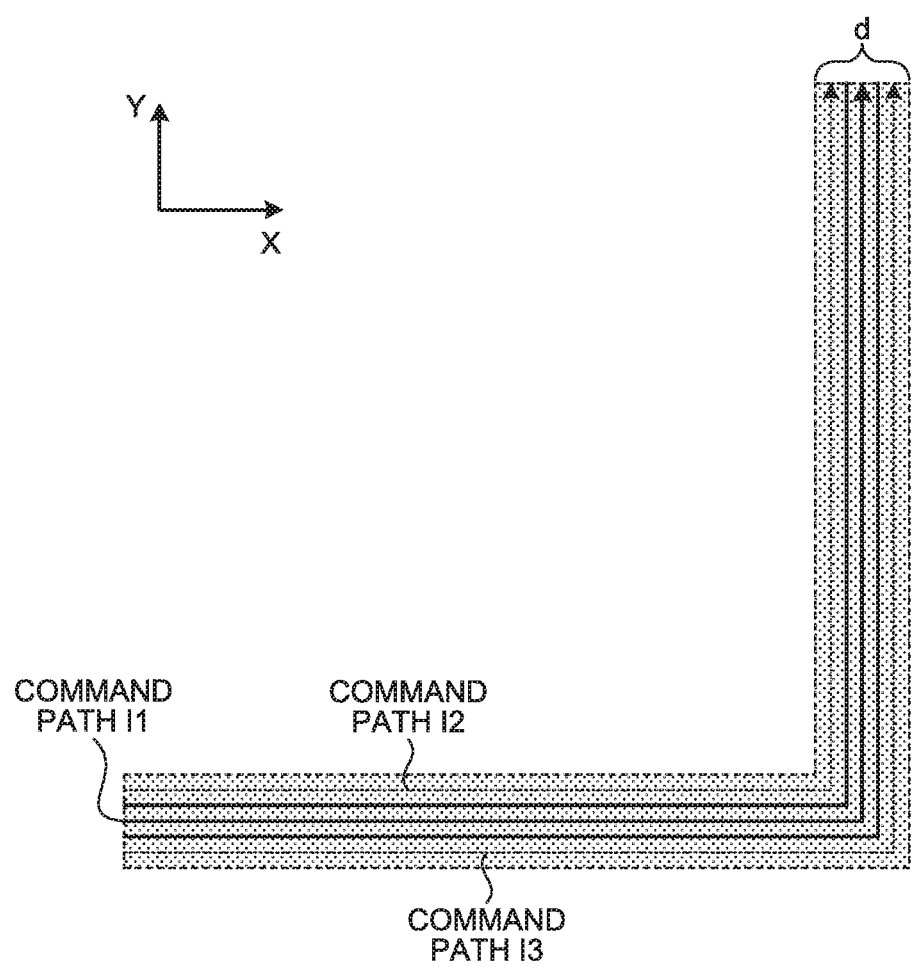
FIG. 22 is a diagram illustrating a difference path for correcting the difference between the target layer shape and the actual layer shape of the third layer according to the second embodiment.

FIG. 22 is a diagram illustrating a difference path for correcting the difference between the target layer shape and the actual layer shape of the third layer according to the second embodiment. The machining program path correcting unit 207 calculates command paths l2 and l3, which are difference paths deviated by ±d/3 in the X direction and the Y direction from the command path l1 and outputs the command paths l2 and l3 to the machining program analyzing unit 101, so that the machine tool 11 can carry out additive manufacturing in three times on command paths l1, l2, and l3.

In this process, deposition on the command paths l2 and l3 is with the width d/3 and the height h by using the laser output value and the metal material supply amount in the deposition condition data D6 similarly to the command path l1. As a result, the difference between the target layer shape and the actual layer shape caused by the change in the deposition condition data can be corrected, and the target layer shape with the deposition width d and the deposition height h can ultimately be formed.

Figure 23:
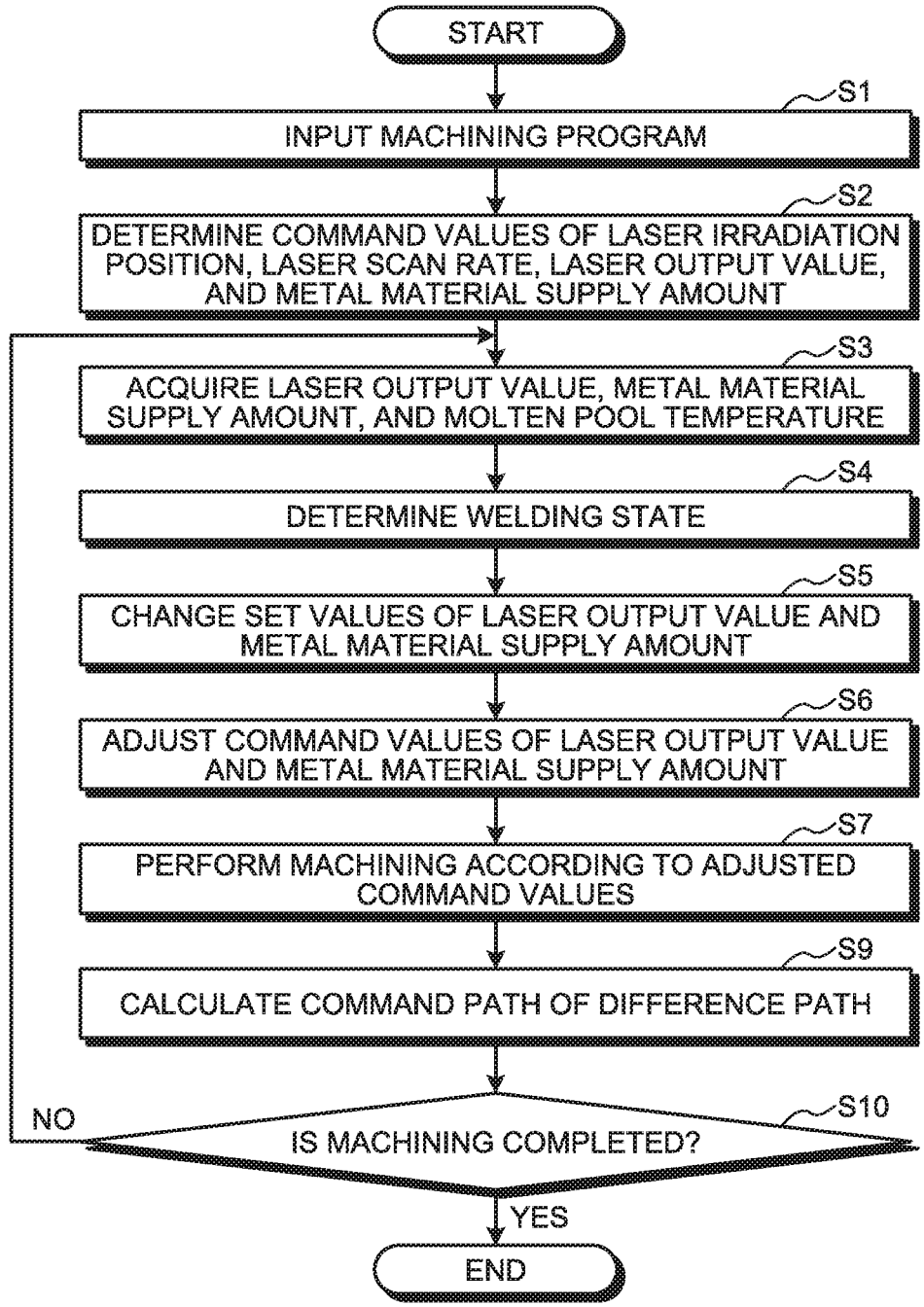
FIG. 23 is a flowchart explaining operation of the deposition condition control device according to the second embodiment.

Hereinafter, the operation of the deposition condition control device 200 will be explained. FIG. 23 is a flowchart explaining the operation of the deposition condition control device 200 according to the second embodiment.

Steps S1 to S4 are the same as steps S1 to S4 in FIG. 14 in the first embodiment, and the explanation thereof will not be repeated.

After step S4, the deposition condition adjusting unit 205 changes the set value of the laser output value and the set value of the metal material supply amount on the basis of the welding state determined by the welding state determination unit 104 (step S5). While the set value of the laser output value and the set value of the metal material supply amount are changed so that the result of determination by the welding state determination unit 104 with the target deposition height and the deposition width will be the stable welding amount state in the first embodiment, the deposition condition adjusting unit 205 is not limited to change the deposition condition data while maintaining the target deposition height and the target deposition width. Even when the target deposition height and the target deposition width are not maintained, the deposition condition adjusting unit 205 can change the set value of the laser output value and the set value of the metal material supply amount to deposition condition data that meet the condition of achieving the stable welding amount range when the welding state determination unit 104 determines the welding state to be the insufficient welding amount state or the excessive welding amount state. As a result, the deposition condition control device 200 has a wider range of adjustment, and enables more flexible adjustment of the laser output value and the metal material supply amount than the deposition condition control device 100 even in a case where no deposition conditions which are the target deposition height and deposition width and with which the stable welding amount state can be achieved are present.

Steps S6 and S7 are the same as steps S6 and S7 in FIG. 14 in the first embodiment, and the explanation thereof will not be repeated.

After step S7, the machining program path correcting unit 207 calculates a command path of the difference path for correcting the difference between the target layer shape and the actual layer shape caused by adjustment of the command value of the layer output value and the command value of the metal material supply amount in steps S5 and S6 (step S9), and outputs the command path to the machining program analyzing unit 101. As a result, the target shape is formed by deposition divided into a plurality of times of deposition.

After step S9, the deposition condition control device 200 determines whether or not machining is completed (step S10). If it is determined that machining is not completed (step S10: No), the operation moves to step S3 in which the operation described above is performed for a difference path or the next layer. Note that, in a case where a difference path is to be machined, nothing is done in steps S3 and S4. If it is determined that machining is completed (step S10: Yes), the deposition condition control device 200 terminates the operation.

As described above, the deposition condition control device 200 according to the second embodiment has a wider range of adjustment and enables more flexible adjustment of the laser output value and the metal material supply amount than the deposition condition control device 100 according to the first embodiment.

Figure 24:
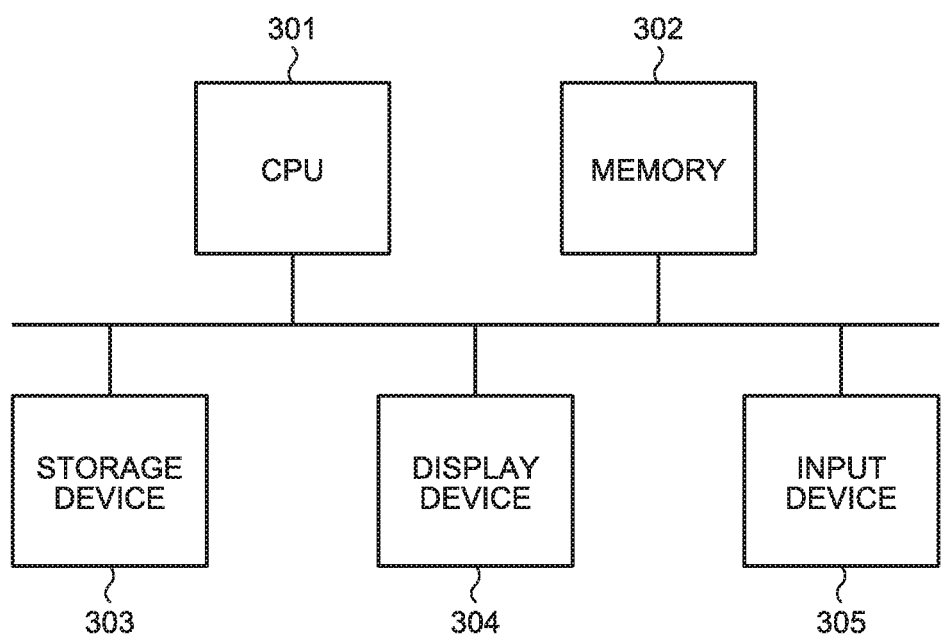
FIG. 24 is a diagram illustrating a hardware configuration for implementing the functions of the deposition condition control devices according to the first and second embodiments by a computer system.

The deposition condition control devices 100 and 200 according to the first and second embodiments are implemented by a computer system such as a personal computer or a general-purpose computer. FIG. 24 is a diagram illustrating a hardware configuration for implementing the functions of the deposition condition control devices 100 and 200 according to the first and second embodiments by a computer system. In the case where the functions of the deposition condition control devices 100 and 200 are implemented by a computer system, the functions of the deposition condition control devices 100 and 200 other than the storage units 110 and 210 are implemented by a central processing unit (CPU) 301, a memory 302, a storage device 303, a display device 304, and an input device 305 as illustrated in FIG. 24. The functions of the deposition condition control performed by the deposition condition control devices 100 and 200 are implemented by software, firmware, or a combination of software and firmware. The software or firmware is described in the form of programs and stored in the storage device 303. The CPU 301 implements the functions of the deposition condition control devices 100 and 200 other than the storage units 110 and 210 by reading the software or firmware stored in the storage device 303 into the memory 302 and executing the software or firmware. Thus, the computer system includes the storage device 303 for storing programs, which, when the functions of the deposition condition control devices 100 and 200 other than the storage units 110 and 210 are executed by the CPU 301, results in execution of steps of performing the deposition condition control method according to the first and second embodiments. In other words, these programs cause a computer to execute the processes performed by the functions of the deposition condition control devices 100 and 200 other than the storage units 110 and 210. The memory 302 is a volatile storage area such as a random access memory (RAM). The storage device 303 is a non-volatile or volatile semiconductor memory such as a read only memory (ROM) or a flash memory, or a magnetic disk. The storage units 110 and 210 are implemented by the memory 302 or the storage device 303. Examples of the display device 304 include a monitor and a display. Examples of the input device 305 include a keyboard, a mouse, and a touch panel.

The configurations presented in the embodiment above are examples of the present invention, and can be combined with other known technologies or can be partly omitted or modified without departing from the scope of the present invention.

REFERENCE SIGNS LIST 10 machining program; 11 machine tool; 100, 200 deposition condition control device; 101 machining program analyzing unit; 102 command value generating unit; 103 data acquiring unit; 104 welding state determination unit; 105, 205 deposition condition adjusting unit; 106 deposition condition outputting unit; 110, 210 storage unit; 207 machining program path correcting unit; 301 CPU; 302 memory; 303 storage device; 304 display device; 305 input device; 11, 12, 13 command path.

The invention claimed is:

1. A deposition condition control device for controlling a deposition condition of a machine tool that moves a laser irradiation position while supplying a metal material onto a portion of a base material to be machined to perform additive manufacturing, the deposition condition control device comprising:
   machining program analyzing circuitry to obtain a scan rate of a laser beam at the laser irradiation position on the basis of a machining program;

data acquiring circuitry to acquire an output value of the laser beam, a supply amount of the metal material, and a temperature of the portion of the base material to be machined in a molten state;

welding state determination circuitry to determine whether or not a welding state of the metal material is a stable welding amount state on the basis of the scan rate, the output value, the supply amount of the metal material, and the temperature of the portion of the base material to be machined in the molten state;

deposition condition adjusting circuitry to adjust the output value and the supply amount of the metal material so that a result of determination by the welding state determination circuitry will be the stable welding amount state;

deposition condition outputting circuitry to output a command value of the output value and a command value of the supply amount of the metal material adjusted by the deposition condition adjusting circuitry to the machine tool; and a memory to store a plurality of sets of deposition condition data, each set including a deposition height, a deposition width, the output value, and the supply amount, wherein the deposition condition adjusting circuitry adjusts the output value and the supply amount so that either an actual deposition height or an actual deposition width will be smaller than the deposition height or the deposition width specified by the machining program or received as an input by using the deposition condition data.

2. The deposition condition control device according to claim 1, further comprising:

a memory to store a plurality of sets of deposition condition data, each set including a deposition height, a deposition width, the output value, and the supply amount, wherein the deposition condition adjusting circuitry adjusts the output value and the supply amount so that the deposition height and the deposition width specified by the machining program or received as an input are maintained by using the deposition condition data.

3. The deposition condition control device according to claim 1, wherein the actual deposition height is a height obtained by equally dividing the deposition height specified by the machining program or received as an input by an integer.

4. The deposition condition control device according to claim 1, wherein the actual deposition width is a width obtained by equally dividing the deposition width specified by the machining program or received as an input by an odd number.

5. The deposition condition control device according to claim 3, further comprising:

machining program path correcting circuitry to calculate a command path of a difference path for correcting a difference between the deposition height specified by the machining program or received as an input and the actual deposition height, or a command path of a difference path for correcting a difference between the deposition width specified by the machining program or received as an input and the actual deposition width.

6. The deposition condition control device according to claim 1, wherein the welding state determination circuitry determines whether or not the welding state is the stable welding amount state by using a welding state transition diagram indicating which of the stable welding amount state, an insufficient welding amount state, or an excessive welding amount state is depending on the scan rate, the output value, and the supply amount.

7. The deposition condition control device according to claim 4, further comprising:

machining program path correction circuitry to calculate a command path of a difference path for correcting a difference between the deposition height specified by the machining program or received as an input and the actual deposition height, or a command path of a difference path for correcting a difference between the deposition width specified by the machining program or received as an input and the actual deposition width.

8. The deposition condition control device according to claim 2, wherein the welding state determination circuitry determines whether or not the welding state is the stable welding amount state by using a welding state transition diagram indicating which of the stable welding amount state, an insufficient welding amount state, or an excessive welding amount state is depending on the scan rate, the output value, and the supply amount.

9. The deposition condition control device according to claim 1, wherein the welding state determination circuitry determines whether or not the welding state is the stable welding amount state by using a wielding state transition diagram indicating which of the stable welding amount state, an insufficient welding amount state, or an excessive welding amount state is depending on the scan rate, the output value, and the supply amount.

10. The deposition condition control device according to claim 3, wherein the welding state determination circuitry determines whether or not the welding state is the stable welding amount state by using a welding state transition diagram indicating which of the stable wielding amount state, an insufficient welding amount state, or an excessive wielding amount state is depending on the scan rate, the output value, and the supply amount.

11. The deposition condition control device according to claim 4, wherein the welding state determination circuitry determines whether or not the welding state is the stable welding amount state by using a welding state transition diagram indicating which of the stable welding amount state, an insufficient welding amount state, or an excessive welding amount state is depending on the scan rate, the output value, and the supply amount.

12. The deposition condition control device according to claim 5, wherein the welding state determination circuitry determines whether or not the welding state is the stable welding amount state by using a welding state transition diagram indicating which of the stable welding amount state, an insufficient welding amount state, or an excessive welding amount state is depending on the scan rate, the output value, and the supply amount.

13. The deposition condition control device according to claim 7, wherein the welding state determination circuitry determines whether or not the welding state is the stable welding amount state by using a welding state transition diagram indicating which of the stable welding amount state, an insufficient welding amount state, or an excessive welding amount state is depending on the scan rate, the output value, and the supply amount.

14. A method of operating a deposition condition control device for controlling a deposition condition of a machine tool that moves a laser irradiation position while supplying a metal material onto a portion of a base material to be machined to perform additive manufacturing, the method comprising:
- obtaining a scan rate of a laser beam at the laser irradiation position on the basis of a machining program;
- acquiring an output value of the laser beam, a supply amount of the metal material, and a temperature of the portion of the base material to be machined in a molten state;
- determining whether or not a welding state of the metal material is a stable welding amount state on the basis of the scan rate, the output value, the supply amount of the metal material, and the temperature of the portion of the base material to be machined in the molten state;
- adjusting the output value and the supply amount of the metal material so that a result of the determining will be the stable welding amount state;
- outputting a command value of the output value and a command value of the supply amount of the metal material adjusted by the adjusting to the machine tool;
- storing a plurality of sets of deposition condition data, each set including a deposition height, a deposition width, the output value, and the supply amount; and
- the adjusting adjusts the output value and the supply amount so that either an actual deposition height or an actual deposition width will be smaller than the deposition height or the deposition width specified by the machining program or received as an input by using the deposition condition data.

* * * * *